US012808784B2

(12) United States Patent
Kosaka et al.

(10) Patent No.: US 12,808,784 B2
(45) Date of Patent: Nov. 24, 2026

(54) PHOTOMETRIC APPARATUS, PHOTOMETRIC METHOD, AND CALIBRATION SYSTEM

(71) Applicant: Konica Minolta, Inc., Tokyo (JP)

(72) Inventors: Akira Kosaka, Yao (JP); Satoshi Masuda, Neyagawa (JP); Junichi Yamazoe, Sakai (JP); Katsutoshi Tsurutani, Osaka (JP)

(73) Assignee: KONICA MINOLTA, INC., Tokyo (JP)

( * ) Notice: Subject to any disclaimer, the term of this patent is extended or adjusted under 35 U.S.C. 154(b) by 130 days.

(21) Appl. No.: 18/762,610

(22) Filed: Jul. 2, 2024

(65) Prior Publication Data

US 2025/0020578 A1 Jan. 16, 2025

(30) Foreign Application Priority Data

Jul. 10, 2023 (JP) ................................ 2023-113010

(51) Int. Cl.
*G01N 21/25* (2006.01)

(52) U.S. Cl.
CPC ......... *G01N 21/251* (2013.01); *G01N 21/255* (2013.01); *G01N 2201/127* (2013.01)

(58) Field of Classification Search
CPC ............... G01N 21/251; G01N 21/255; G01N 2201/127; G01J 1/0418; G01J 1/0437;
(Continued)

(56) References Cited

U.S. PATENT DOCUMENTS 5,758,644 A 6/1998 Diab et al.
2004/0021087 A1 2/2004 Tokhtuev et al.
(Continued)

FOREIGN PATENT DOCUMENTS

| | | |
|---|---|---|
| JP | 5454675 B2 | 3/2014 |
| TW | 202111319 A | 3/2021 |
| WO | 2010/136810 A2 | 12/2010 |

OTHER PUBLICATIONS

Office Action, dated Jun. 5, 2025, which was issued for the corresponding Taiwanese patent application No. 113120040, 16 pages, with English translation.
(Continued)

*Primary Examiner* — Tarifur R Chowdhury
*Assistant Examiner* — Carlos Perez-Guzman
(74) *Attorney, Agent, or Firm* — LUCAS & MERCANTI, LLP

(57) ABSTRACT

The photometric apparatus includes a light receiver having one or a plurality of light receiving sensors that receive light to be measured from an object to be measured; a controller that calculates a measured value based on an output from the one or plurality of light receiving sensors; a light attenuation member that is disposed so as to be insertable in and removable from a light path of the light to be measured and attenuates the light to be incident on the light receiver; and a corrector that corrects a difference between a measured value calculated by the controller in a state in which the light attenuation member is inserted in the light path and a measured value calculated by the controller in a state in which the light attenuation member is not inserted in the light path, the measured values varying depending on a characteristic of the object.

23 Claims, 30 Drawing Sheets

(58) Field of Classification Search
CPC ...... G01J 1/0488; G01J 3/0213; G01J 3/0229; G01J 3/506; G01J 3/51; G01J 3/0297; G01J 3/021; G01J 3/0227; G01J 3/027; G01J 2001/444; G01J 2003/2866; G01M 11/0207
See application file for complete search history.

(56) References Cited

U.S. PATENT DOCUMENTS

| | | | | |
|---|---|---|---|---|
| 2006/0166142 | A1* | 7/2006 | Toyoda | G01M 11/0207 430/311 |
| 2009/0116002 | A1* | 5/2009 | Imai | G01J 1/44 356/218 |
| 2014/0233105 | A1* | 8/2014 | Schmeder | G02B 5/201 359/590 |
| 2015/0103229 | A1* | 4/2015 | Nozawa | H04N 23/71 348/342 |
| 2015/0124232 | A1* | 5/2015 | Yamamoto | G03F 9/7003 355/67 |
| 2017/0010273 | A1* | 1/2017 | Takinami | G01N 33/49 |
| 2019/0229137 | A1* | 7/2019 | Kubo | H04N 23/54 |
| 2023/0030688 | A1* | 2/2023 | Ni | A61B 5/7225 |
| 2026/0177732 | A1* | 6/2026 | Coppers | G01J 3/0213 |

OTHER PUBLICATIONS

Office Action, dated Oct. 13, 2025, which was issued for the corresponding Taiwanese Patent Application No. 113120040, 33 pages, with English translation.

Office Action, dated Jun. 9, 2026, which was issued for the corresponding Taiwan Patent Application No. 113120040, 29 pages, with English translation.

* cited by examiner

10

AMOUNT OF RECEIVED LIGHT THAT INCREASES DUE TO EFFECT OF MULTIPLE REFLECTION = 0.45/90 = 0.5%

AMOUNT OF RECEIVED LIGHT THAT INCREASES DUE TO EFFECT OF MULTIPLE REFLECTION = 0.00456/4.5 = 0.1%

AVERAGE TRANSMITTANCE IN VISUAL LIGHT RANGE (380nm TO 780nm) ≈ 5%

AVERAGE REFLECTANCE IN VISUAL LIGHT RANGE (380nm TO 780nm) ≈ 2%

AMOUNT OF RECEIVED LIGHT THAT INCREASES DUE TO EFFECT OF MULTIPLE REFLECTION = 0.09/90 = 0.10%

AMOUNT OF RECEIVED LIGHT THAT INCREASES DUE TO EFFECT OF MULTIPLE REFLECTION = 0.00091/4.5 = 0.02%

AMOUNT OF RECEIVED LIGHT THAT INCREASES DUE TO EFFECT OF MULTIPLE REFLECTION = 0.45/90 = 0.5%

AMOUNT OF RECEIVED LIGHT THAT INCREASES DUE TO EFFECT OF MULTIPLE REFLECTION = 0.02256/4.5 = 0.5%

AMOUNT OF RECEIVED LIGHT THAT INCREASES DUE TO EFFECT OF MULTIPLE REFLECTION = 0.09/90 = 0.10%

AMOUNT OF RECEIVED LIGHT THAT INCREASES DUE TO EFFECT OF MULTIPLE REFLECTION = 0.00451/4.5 = 0.1%

AVERAGE TRANSMITTANCE IN VISUAL LIGHT RANGE (380nm TO 780nm)≈5%

1=AVERAGE REFLECTANCE IN VISUAL LIGHT RANGE (380nm TO 780nm)≈10%
2=AVERAGE REFLECTANCE IN VISUAL LIGHT RANGE (380nm TO 780nm)≈5%
3=AVERAGE REFLECTANCE IN VISUAL LIGHT RANGE (380nm TO 780nm)≈5%

AVERAGE TRANSMITTANCE IN VISUAL LIGHT RANGE (380nm TO 780nm) ≈ 5%

AVERAGE REFLECTANCE IN VISUAL LIGHT RANGE (380nm TO 780nm) ≈ 1.5% (SINGLE-LAYER ANTIREFLECTION FILM)

AVERAGE REFLECTANCE IN VISUAL LIGHT RANGE (380nm TO 780nm) ≈ 4.5% (WITHOUT ANTIREFLECTION FILM AND WITH ONLY PROTECTIVE FILM)

10

AVERAGE TRANSMITTANCE IN VISUAL LIGHT RANGE (380nm TO 780nm)≈95%

AVERAGE REFLECTANCE IN VISUAL LIGHT RANGE (380nm TO 780nm) ≈1.5% (SINGLE-LAYER ANTIREFLECTION FILM)

AVERAGE REFLECTANCE IN VISUAL LIGHT RANGE (380nm TO 780nm) ≈4.5% (WITHOUT ANTIREFLECTION FILM AND WITH ONLY PROTECTIVE FILM)

*FIG. 26*

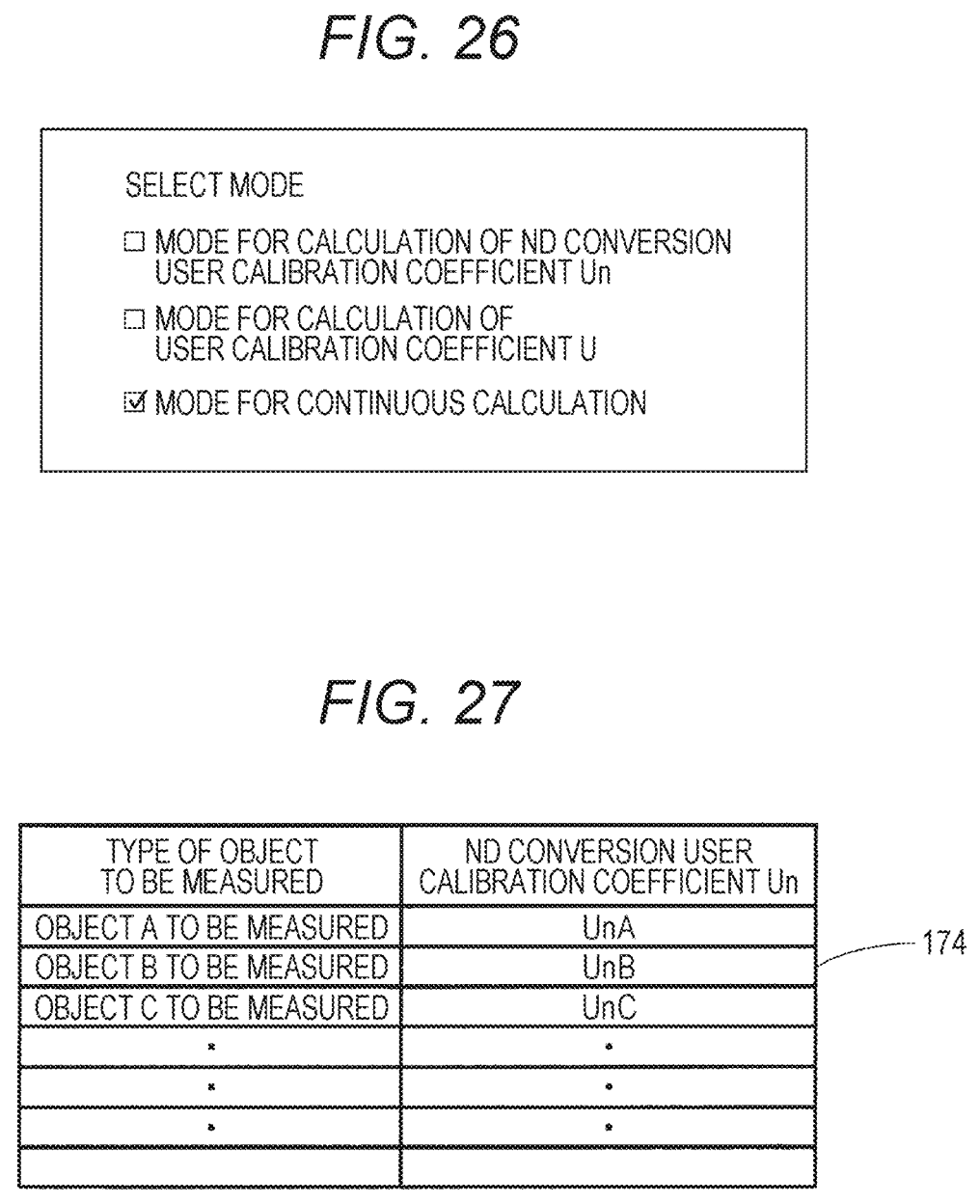

SELECT MODE

☐ MODE FOR CALCULATION OF ND CONVERSION USER CALIBRATION COEFFICIENT Un

☐ MODE FOR CALCULATION OF USER CALIBRATION COEFFICIENT U

☑ MODE FOR CONTINUOUS CALCULATION

*FIG. 27*

| TYPE OF OBJECT TO BE MEASURED | ND CONVERSION USER CALIBRATION COEFFICIENT Un |
|---|---|
| OBJECT A TO BE MEASURED | UnA |
| OBJECT B TO BE MEASURED | UnB |
| OBJECT C TO BE MEASURED | UnC |
| • | • |
| • | • |
| • | • |
| | |

174

PHOTOMETRIC APPARATUS, PHOTOMETRIC METHOD, AND CALIBRATION SYSTEM

CROSS-REFERENCE TO RELATED APPLICATION

The disclosure of Japanese Patent Application No. 2023-113010 filed on Jul. 10, 2023, including description, claims, drawings, and abstract, is incorporated herein by reference in its entirety.

BACKGROUND OF THE INVENTION

1. Technical Field

The present invention relates to a photometric apparatus and a photometric method capable of measuring luminance, chromaticity, and the like of light emitted from an object to be measured, such as a display of a smartphone or a liquid crystal monitor, and a calibration system that calibrates the photometric apparatus.

2. Description of Related Art

As a photometric apparatus as described above, as illustrated in FIG. 25, there is known a photometric apparatus 100 provided with a splitting optical system 120 for splitting light 201 to be measured from an object 200 to be measured into a plurality of light rays (for example, Japanese Patent No. 5454675).

This photometric apparatus includes an objective optical system 110 including a convex lens or the like, the splitting optical system 120, and colorimetric optical systems 130 to 150. As an example, a bundle fiber is used for the splitting optical system 120. The bundle fiber is formed by bundling a plurality of strand fibers having a small diameter. On the emission end (exit) side of the bundle fiber, the plurality of strand fibers are randomly branched into a plurality of pieces, and the plurality of pieces are bundled in groups of the pieces. The number of branches is, for example, three corresponding to tristimulus values of color-matching functions X, Y, and Z defined by the Commission Internationale de l'Eclairage (CIE). Furthermore, a diffuser plate may be used as the splitting optical system 120.

As the colorimetric optical systems 130 to 150, for example, wavelength-selective filters and light receiving sensors that are light receiving elements are used in combination in a number equal to the number of branches of the splitting optical system 120.

Light received by the light receiving sensors is converted into electrical signals, electrical processing sections 161*a* to 161*c* perform processing such as I/V conversion and amplification on the electrical signals, and the electrical signals are input to a controller 162 as received light data. The controller 162 performs calculation based on the input received light data to calculate a measured value.

In recent years, displays having a wide luminance dynamic range have been used in smartphones and the like. Therefore, the photometric apparatus is required to have capability to measure luminance from low luminance to high luminance in performing gamma inspection, adjustment, or the like.

In order to widen the dynamic range of the photometric apparatus 100, it is necessary to control the amount of received light due to constraints on the photoelectric conversion capability of the light receiving sensors (saturation of the light receiving sensors) and the design conditions of the electrical processing sections 161*a* to 161*c*. Therefore, it is conceivable to insert or remove, in accordance with the brightness of the object 200 to be measured, a light attenuation member into or from the light path of the light 201 that is to be measured and has been emitted from the object 200 to be measured and will enter the light receiving sensors.

However, when the light attenuation member is inserted and removed in order to widen the dynamic range, an error occurs due to the insertion and removal of the light attenuation member in a case where the light attenuation member in which the reflectance of the surface of the light attenuation member on the measurement object side is different from the internal reflectance of the photometric apparatus (the reflection of an XYZ wavelength-selective filter or the light receiving sensor).

Therefore, it is conceivable that not only a correction coefficient in a state in which the light attenuation member is not inserted in the light path but also a correction coefficient in the state in which the light attenuation member is inserted in the light path are stored in the photometric apparatus for the calibration of the photometric apparatus in a manufacturing factory (factory calibration).

However, as a result of an experiment by the inventor, it has been found that in some cases, linear continuity cannot be obtained in measured values in a state in which the light attenuation member is not inserted in the light path and a state in which the light attenuation member is inserted in the light path, and a case where a level difference occurs in measured values at the time of switching between insertion and removal of the light attenuation member.

After the consideration of the cause, the inventor has found that a difference in characteristics, such as a surface reflectance, between objects to be measured affects the above-described problem.

SUMMARY OF THE INVENTION

An object of the present invention is to provide a photometric apparatus capable of solving the problem that linear continuity cannot be obtained in measured values in a state in which a light attenuation member is not inserted in a light path of light to be measured and a state in which the light attenuation member is inserted in the light path, regardless of a difference in characteristics between objects to be measured.

Another object of the present invention is to provide a photometric method and a calibration system that can solve the same problem as described above regardless of a difference in characteristics between objects to be measured.

A first aspect of the present invention relates to a photometric apparatus including:

- a light receiver having one or a plurality of light receiving sensors that receive light to be measured from an object to be measured;
- a controller that calculates a measured value based on an output from the one or plurality of light receiving sensors;
- a light attenuation member that is disposed so as to be insertable in and removable from a light path of the light to be measured and attenuates the light to be incident on the light receiver; and
- a corrector that corrects a difference between a measured value calculated by the controller in a state in which the light attenuation member is inserted in the light path and a measured value calculated by the controller in a state in which the light attenuation member is not inserted in the light path, the measured values varying depending on a characteristic of the object to be measured.

A second aspect of the present invention relates to a photometric method for a photometric apparatus including a light receiver having one or a plurality of light receiving sensors that receive light to be measured from an object to be measured, and a controller that calculates a measured value based on an output from the one or plurality of light receiving sensors, the photometric method including:

inserting and removing a light attenuation member into and from a light path of the light to be measured in the photometric apparatus; and correcting a difference between a measured value calculated by the controller in a state in which the light attenuation member is inserted in the light path and a measured value calculated by the controller in a state in which the light attenuation member is not inserted in the light path, the measured values varying depending on a characteristic of the object to be measured.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 26 is a diagram illustrating a selection screen for a mode for calculating a correction coefficient;

FIG. 27 is a diagram for explaining a state in which a plurality of types of ND conversion user calibration coefficients Un are stored.

DETAILED DESCRIPTION

Hereinafter, one or more embodiments of the present invention will be described with reference to the drawings. However, the scope of the invention is not limited to the disclosed embodiments.

Hereinafter, embodiments of the present invention will be described with reference to the drawings.

First Embodiment

Overall Configuration

Figure 1:
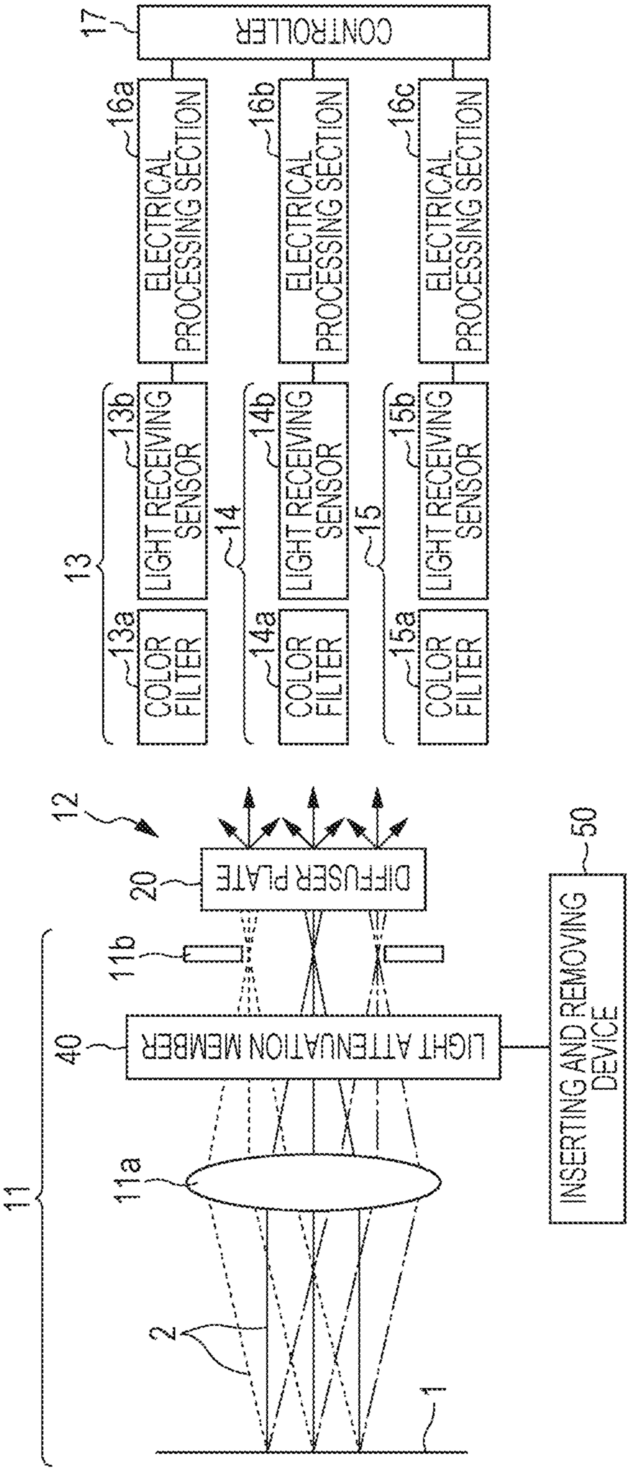
FIG. 1 is a block diagram illustrating an internal configuration of a photometric apparatus according to a first embodiment of the present invention.

FIG. 1 is a block diagram illustrating a configuration of a tristimulus value type photometric apparatus according to a first embodiment of the present invention.

In FIG. 1, the photometric apparatus 10 is used, for example, in an inspection process for a manufacturing line of a display of a smartphone, and measures brightness, chromaticity, and the like of a display surface of the display which is an object 1 to be measured.

The photometric apparatus 10 includes an objective optical system 11, a splitting optical system 12, colorimetric optical systems 13 to 15, and a light attenuation member 40. A convex lens 11*a* having positive power is used as the objective optical system 11. As the splitting optical system 12, a diffuser plate 20 having functions of splitting and diffusion is used.

An aperture diaphragm 11*b* is arranged at a rear-side focal position of the convex lens 11*a*, and a front-side telecentric optical arrangement is formed in order to take in light components within a predetermined angular range (of, for example, ±2.5 degrees) with respect to a normal line of a surface to be measured which is the display surface of the object 1 to be measured. The diffuser plate 20 is disposed behind a surface of the aperture diaphragm 11*b*.

The light attenuation member 40 is disposed between the convex lens 11*a* and the diffuser plate 20 and in front of a surface of the aperture diaphragm 11*b*. The light attenuation member 40 is driven by an inserting and removing device 50 so as to be inserted into or removed from a light path of light 2 to be measured. The inserting and removing device 50 is a driving device The inserting and removing device 50 includes, for example, a linear actuator. In a state in which the light attenuation member 40 is inserted in the light path of the light 2 to be measured, the amount of the light 2 to be incident on the diffuser plate 20 and to be measured is reduced by the light attenuation member 40. In a state in which the light attenuation member 40 is removed from the light path of the light 2 to be measured, the light 2 to be measured is incident on the diffuser plate 20 without a decrease in the amount of the light 2 to be measured. In the following description, the "light attenuation member" is also referred to as a "dimming member" or an "ND filter".

The dimming member 40 is inserted in and removed from the light path in accordance with the brightness of the object 1 to be measured. To be specific, when the object 1 to be measured is dark, the dimming member 40 is in a removed state, and when the object 1 to be measured is bright, the dimming member 40 is inserted into the light path, thereby preventing saturation of light receiving sensors 13*b*, 14*b*, and 15*b* by reducing the amount of the light. As a result, the intensity of the light 2 to be measured is within a dynamic range of the light receiving sensors 13*b*, 14*b*, and 15*b*, and as a result, the dynamic range of the photometric apparatus 10 is expanded.

It is desirable that the dimming member 40 be arranged close to a light collecting position (the position of the aperture diaphragm 11*b*) of the objective optical system 11. In the light path of the light 2 to be received and measured, an effective light path at the position of the aperture diaphragm is short. As the effective light path is shorter, the size of the dimming member 40 may be smaller, the size of the inserting and removing device 50 may be smaller, and the driving torque may be lower. Therefore, the product becomes compact, the weight becomes light, and the cost becomes low. The aperture diaphragm 11*b* may not be provided.

In the present embodiment, the dimming member 40 needs to have a reflective member having transparency on its surface. This point will be described later. As the dimming member 40, various filters such as a thin film filter, a glass absorption filter, and a porous plate can be used as long as they have a reflective member.

However, it is important that the light attenuation member 40 has spectral flatness (uniformity). This is because the flatness affects the spectral responsivity in the inserted or removed state of the light attenuation member 40 (with or without the light attenuation member 40). In a case where the light attenuation member 40 does not have flatness, received light spectral sensitivity in a case where the light attenuation member 40 is not present (or is removed from the light path) and received light spectral sensitivity in a case where the light attenuation member 40 is present (or is inserted in the light path) are different from each other. When the received light spectral sensitivity deviates from color-matching functions, an error occurs in luminance and chromaticity. It is also important that there is no change due to environmental temperature or the like.

The glass absorption filter is inferior in spectral flatness and the transmittance of the glass absorption filter largely changes due to environmental temperature. Although the porous plate has spectral flatness, a measured acceptance angle may vary. In addition, strict position repeatability is required. The thin film filter has good spectral flatness and high reliability with respect to environmental temperature. Therefore, the thin film filter is preferably used as the light attenuation member 40.

Figure 2:
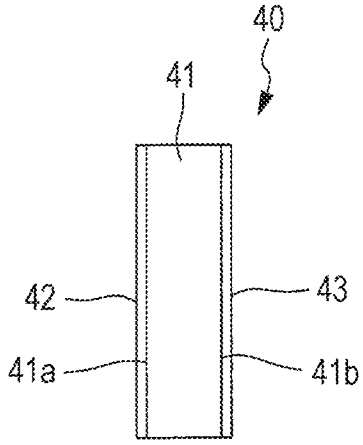
FIG. 2 is an explanatory diagram of a light attenuation member in which a thin film filter is used.

FIG. 2 illustrates an example of the light attenuation member 40 in which a thin film filter is used.

With reference to FIG. 2, the light attenuation member 40 includes thin films 42 and 43 and a transparent substrate 41 supporting the thin films 42 and 43. The transparent substrate 41 is formed of an optical material that is transparent to the light 2 to be measured, such as glass, plastic, quartz, or sapphire, for example. The transparent optical material forming the transparent substrate 41 can be appropriately selected in accordance with the wavelength range of the light 2 to be measured.

Each of the thin films 42 and 43 is formed on at least one of an incident surface 41*a* and an emission surface 41*b* of the transparent substrate 41. Specifically, the light attenuation member 40 includes at least one of the thin films 42 and 43.

The thin film 42 is formed on the incident surface 41*a* of the transparent substrate 41. The thin film 43 is formed on the emission surface 41*b* of the transparent substrate 41. Specifically, the thin films 42 and 43 are formed on both the incident surface 41*a* and the emission surface side 41*b* of the transparent substrate 41.

To be specific, the light attenuation member 40 includes the thin film 42 formed on the incident surface 41*a* of the transparent substrate 41 and the thin film 43 formed on the emission surface 41*b* of the transparent substrate 41. The thin films 42 and 43 may have the same film structure or different film structures. The thin films 42 and 43 may be formed of the same material or different materials. The thin films 42 and 43 may be, for example, interference films formed of a dielectric material such as $SiO_2$ or $MgF_2$, or may be metal-oxide films formed of a metal-oxide material such as $Al_2O_3$, $TiO_2$, $Nb_2O_5$, or NbO. Alternatively, as the material of the thin films 42 and 43, a metal material such as Cr or Nb may be used.

An absorption type light attenuation member that absorbs light inside a substrate (e.g., a glass substrate) is known as the light attenuation member 40. The degree of freedom in designing the transmission spectrum of the absorption type light attenuation member is relatively low. In addition, the stability of the absorption type light attenuation member with respect to environment temperature and environment humidity is relatively low. On the other hand, the degree of freedom in designing the transmission spectrum of the interference type light attenuation member (for example, the light attenuation member 40 including the thin films 42 and 43 which are the interference films) is relatively high. In addition, the stability of the interference type light attenuation member with respect to environmental temperature and environmental humidity is relatively high.

The colorimetric optical systems 13, 14, and 15 include wavelength-selective filters (also referred to as color filters in the following description) 13*a*, 14*a*, and 15*a* which are color-matching function filters for tristimulus values of X, Y, and Z, respectively. The colorimetric optical systems 13, 14, and 15 include light receiving sensors 13*a*, 14*a*, and 15*a* which are light receiving elements used in combination with the color filters 13*b*, 14*b*, and 15*b*, respectively.

The color filters 13*a*, 14*a*, and 15*a* may be formed by laminating a plurality of light absorption type filters such that the color filters 13*a*, 14*a*, and 15*a* have transmittances corresponding to desired spectral characteristics, such as the tristimulus values of X, Y, and Z, for incident light. However, in such a configuration, there is a problem that a filter having transmittance peaks in two wavelength regions cannot be designed, that is, the degree of freedom of filter design is low. In addition, each of the light absorption type filters also has a problem in that the transmittance is low and a light amount loss is large. Furthermore, particularly in the case of a film-shaped color filter, there is a problem in that the color filter changes rapidly over time (has poor stability) with respect to heat, light (ultraviolet rays), humidity, and the like.

Therefore, it is desirable to use interference type filters (hereinafter, referred to as interference film filters) for the color filters 13*a*, 14*a*, and 15*a*, instead of the light absorption type filters. Each of the interference film filters is formed by laminating several tens of layers of dielectrics or oxides on a glass substrate by a method such as vacuum deposition or sputtering, and is a filter for selecting a wavelength for transmission or reflection by an interference action of light.

Therefore, the interference film filter is easy to obtain a desired transmittance (that is, easy to design and has a high degree of freedom in design) as compared with the above-described light absorption type filter, and a filter having two peaks (mountains) like the color-matching function X can be formed. In addition, since the interference film filter has a high transmittance, for example, the peak transmittance of the interference film filter is close to 100% while the peak transmittance of the light absorption type filter is 50% or less. Furthermore, the interference film filter has an advantage of excellent reliability (a less change in transmittance over time due to temperature, humidity, and exposure to light).

Figure 3A:
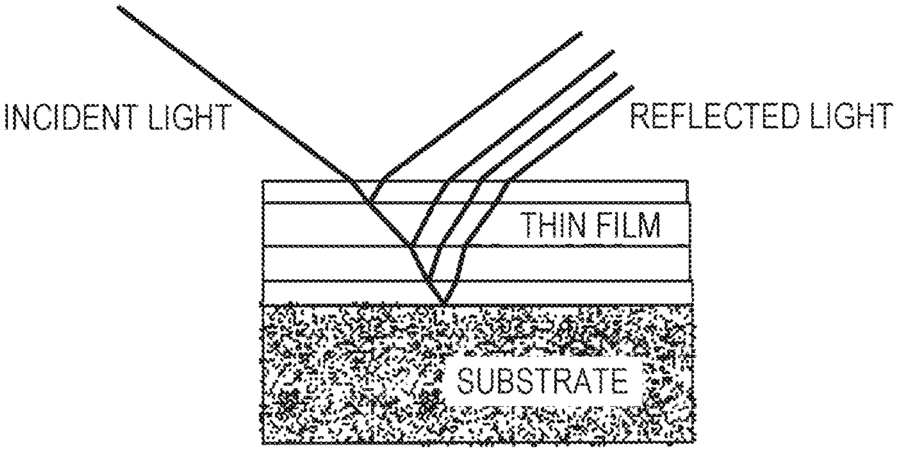
FIG. 3A is a schematic diagram for explaining a state of reflection of incident light on an interference film filter used as a wavelength-selective filter.

In the interference film filters used as the color filters 13*a*, 14*a*, and 15*a*, the film material (dielectrics) absorbs little light. As illustrated in FIG. 3A, incident light (light to be measured) other than transmitted light is reflected off each layer and becomes a reflected light ray.

Figure 3B:
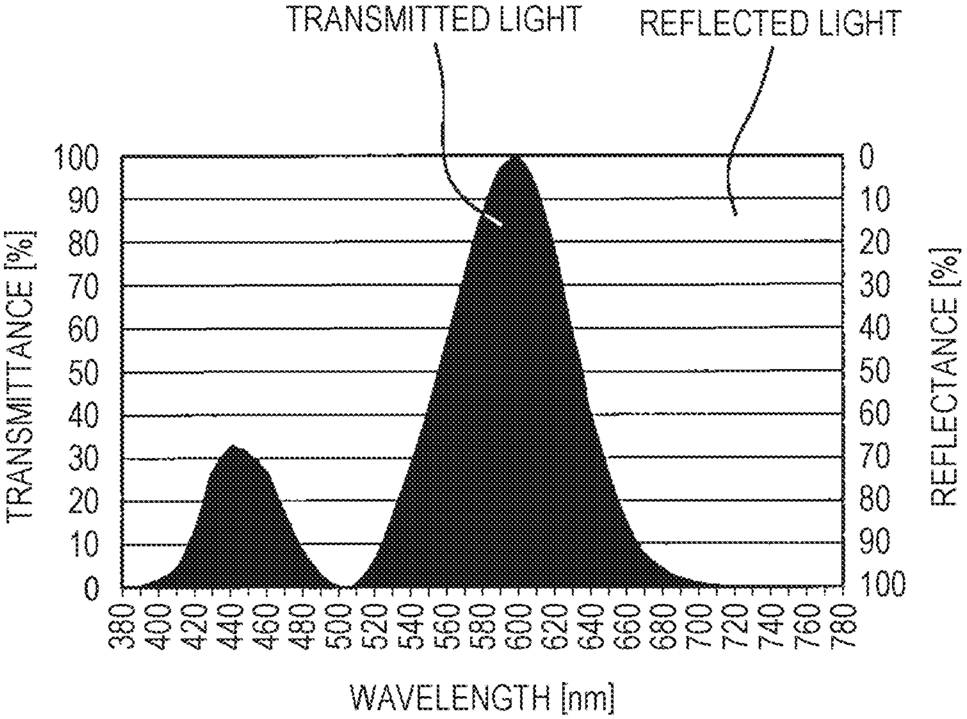
FIG. 3B is a graph illustrating the transmittance and reflectance of the interference film filter.

FIG. 3B is a graph of the transmittance and reflectance of the interference film filter as an X-filter. In FIG. 3B, a black portion inside a characteristic curve of the transmittance with respect to a wavelength corresponds to transmitted light, a white portion outside the characteristic curve corresponds to reflected light, and the transmittance+the reflectance≈100%.

In the present embodiment, silicon sensors are used as the light receiving sensors 13*b*, 14*b*, and 15*b*.

Light received by the light receiving sensors 13*b*, 14*b*, and 15*b* is converted into electrical signals, the electrical signals are subjected to processing such as I/V conversion and amplification in the corresponding electrical processing sections 16*a*, 16*b*, and 16*c*, and are then input as received light data to a controller 17. The controller 17 performs calculation based on the input received light data to calculate a measured value.

Incidentally, as described in the Description of the Related Art, the inventor has found that there is a problem that when the dimming member 40 is inserted into or removed from the light path of the light 2 to be measured, linear continuity is not obtained in measured values due to a difference in surface reflectance between objects 1 to be measured. First, this problem will be described.

Problem Occurring when Dimming Member 40 is Inserted and Removed

Figure 4A:
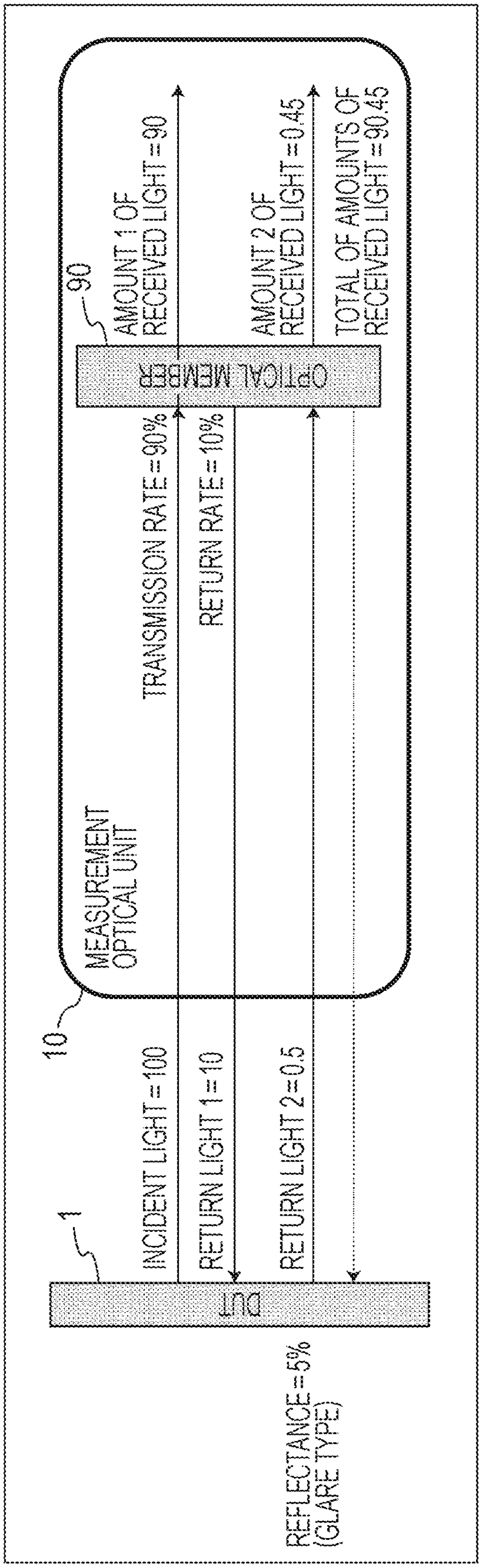
FIG. 4A is a schematic diagram for considering a state in which light to be measured from a glare type object to be measured enters a measurement optical unit of the photometric apparatus in a state in which the light attenuation member is not inserted in a light path of the light to be measured.

As schematically illustrated in FIG. 4A, a state is considered in which the light 2 to be measured that is from the object 1 to be measured (denoted as "DUT" in FIG. 4A) enters a measurement optical unit of the photometric apparatus 10 in a state in which the dimming member 40 is not inserted in (or is removed from the light path) the light path of the light 2 to be measured. The measurement optical unit includes the splitting optical system 12 and the colorimetric optical systems 13 to 15. The splitting optical system 12 and the colorimetric optical systems 13 to 15 are collectively referred to as an "optical member" in FIG. 4A. Part of light incident on the optical member 90 passes through the splitting optical system 12 and the color filters 13*a*, 14*a*, and 15*a* in the optical member 90 and is received by the light receiving sensors 13*b*, 14*b*, and 15*b*. A part of the light is reflected off the surfaces of the color filters 13*a*, 14*a*, and 15*a* and the light receiving sensors 13*b*, 14*b*, and 15*b*, passes through the optical member 90 in the opposite direction, and returns to the object 1 to be measured.

Here, the ratio of the light that passes through the optical member 90 and is finally received by the light receiving sensors 13*b*, 14*b*, and 15*b* to the light 2 to be measured that is incident on the optical member 90 is a transmission rate.

The ratio of the light that is reflected off the light receiving sensors 13*b*, 14*b*, and 15*b*, passes through the optical member, and returns toward the object 1 to be measured to the light 2 to be measured that is incident on the optical member 90 is a return rate. The light returning toward the object 1 to be measured and the light re-reflected off the object 1 to be measured and returning to the optical member are return light.

Further, among objects 1 to be measured, a display having a high surface reflectance is referred to as a glare-type object to be measured or simply as a glare object. In general, the glare object has a specular reflectance of about 5%. On the other hand, among the objects 1 to be measured, a display having a low surface reflectance is referred to as a non-glare type object to be measured or simply referred to as a non-glare object. In general, the non-glare object has a specular reflectance of about 1%. In addition, many smartphones are of a glare type, and many displays of personal computers are of a non-glare type.

In the schematic diagram of FIG. 4A, a glare object having a reflectance of 5% is used as the object 1 to be measured, and the intensity of incident light which is emitted from the object 1 to be measured and enters the photometric apparatus 10 is 100. Furthermore, the optical member 90 of the photometric apparatus 10 has a transmission rate of 90% and a return rate of 10%.

Under this condition, when incident light having an intensity of 100 enters the optical member 90, the optical member 90 has a transmission rate of 90%, and thus the amount 1 of the received light at the light receiving sensors 13*b*, 14*b*, and 15*b*=90. On the other hand, since the return rate of the optical member 90 is 10%, the return light 1=10. The return light 1 is reflected off the surface of the object 1 that is to be measured and has a reflectance of 5%, and returns to the optical member of the photometric apparatus 10 as return light 2=0.5.

The return light 2 passes through the optical member 90, and is received by the light receiving sensors 13*b*, 14*b*, and 15*b* as the amount 2 of the received light=0.45.

A part of the return light 2 is reflected off the optical member 90 and returns to the object 1 to be measured, and is repeatedly reflected off the measured object 1 and the optical member 90. However, since the intensity of the light becomes gradually lower, the light is ignored.

The total of the amount 1 of the received light and the amount 2 of the received light at the light receiving sensors 13*b*, 14*b*, and 15*b* is 90.45. Therefore, the ratio of the amount 2 of the received light, which is the amount of the received light due to reflection off the optical member 90 and the reflection off the surface of the object 1 to be measured, to the amount 1 of the received light, in other words, the amount of the received light that increases due to the effect of the multiple reflection=0.45/90=0.5%.

Figure 4B:
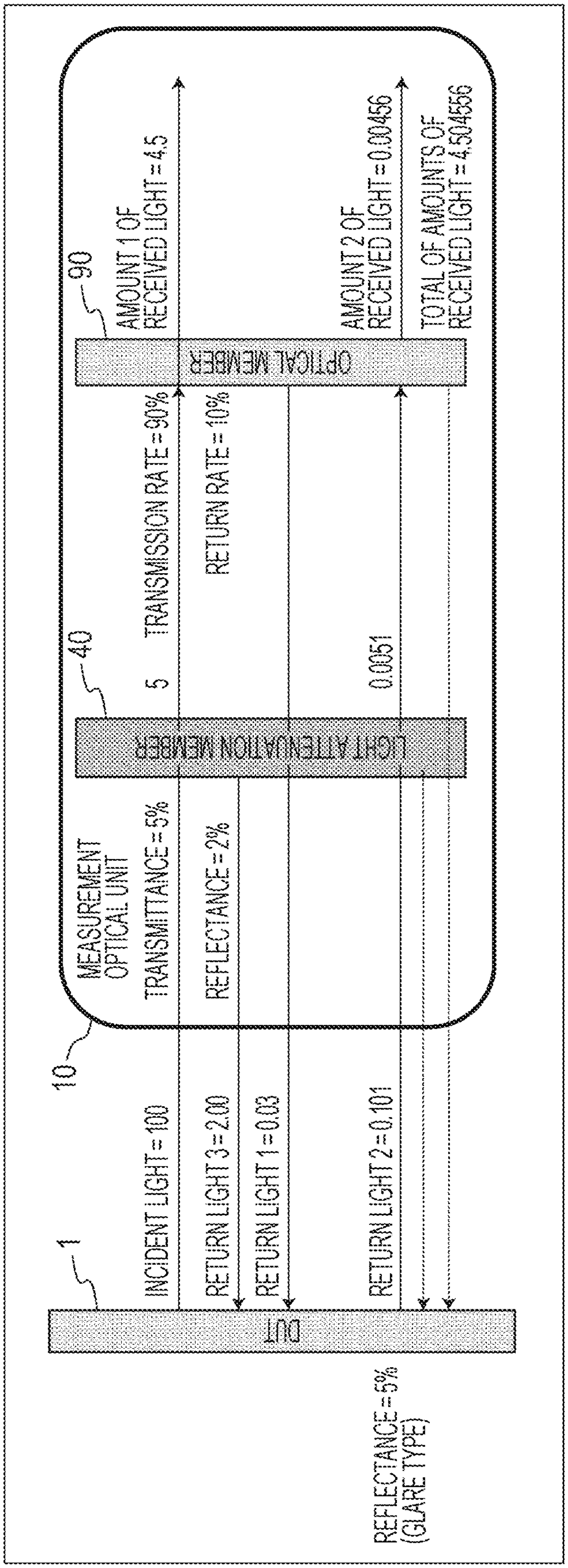
FIG. 4B is a schematic diagram for considering a state in which the light attenuation member is inserted in the light path of light to be measured.

Next, a state in which the light 2 to be measured enters the photometric apparatus 10 in a state in which the dimming member 40 is inserted in the light path of the light 2 to be measured in front of the optical member 90 (between the object 1 to be measured and the optical member 90) will be considered with reference to the schematic diagram of FIG. 4B.

Figure 5A:
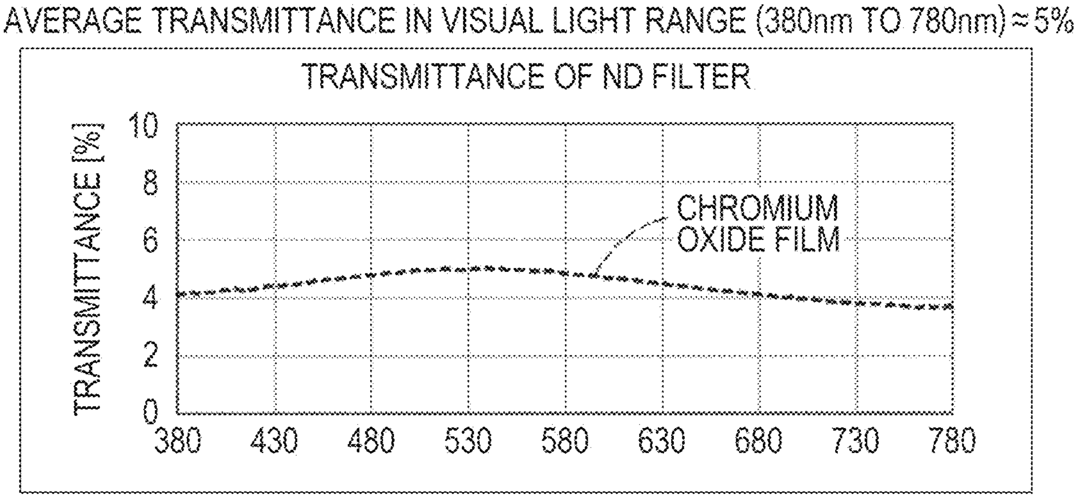
FIG. 5A and FIG. 5B are graphs illustrating examples of the transmittance and reflectance of the light attenuation member including a thin film filter in which a thin film is a chromium oxide film in a visible light range (wavelengths of 380 to 780 nm)
Figure 5B:
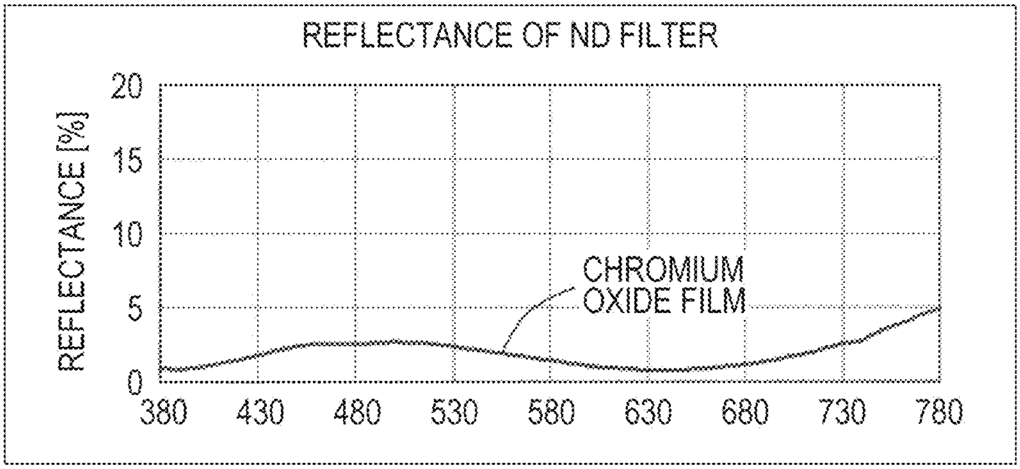

In FIG. 4B, the object 1 to be measured and the optical member 90 are the same as those in FIG. 4A. For the dimming member 40, the transmittance=5% and the reflectance=2%. The dimming member 40 corresponds to a thin film filter of a chromium oxide film. FIG. 5A illustrates the transmittance of the thin film filter of the chromium oxide film, and FIG. 5B illustrates the reflectance of the thin film filter of the chromium oxide film. In a visible light range (380 nm to 780 nm), the average transmittance is 5% and the average reflectance is 2%.

Under this condition, when the incident light=100 from the object 1 to be measured enters the photometric apparatus 10, the light passing through the dimming member 40 and the optical member 90 is received by the light receiving sensors 13*b*, 14*b*, and 15*b* as the amount 1 of the received light=4.5. Further, the light reflected off the optical member 90 returns to the object 1 to be measured through the dimming member 40 (return light 1=0.03). The light incident from the object 1 to be measured and reflected off the dimming member 40 also returns to the object 1 to be measured (return light 3=2.00). The return light 1 and the return light 3 that have returned to the object 1 to be measured are reflected off the surface of the object 1 to be measured, become the return light 2=0.101, pass through the dimming member 40 again, enters the optical member 90, and are received by the light receiving sensors 13*b*, 14*b*, and 15*b* as the amount 2 of the received light=0.00456.

The total of the amount 1 of the received light and the amount 2 of the received light at the light receiving sensors 13*b*, 14*b*, and 15*b* is 4.504556. Therefore, the ratio of the amount 2 of the received light, which is the amount of the received light due to reflection off the optical member 90 and the reflection off the surface of the object 1 to be measured, to the amount 1 of the received light, in other words, the amount of the received light that increases due to the effect of the multiple reflection=0.00456/4.5=0.1%.

In comparison between a case where the dimming member 40 is not inserted in the light path as illustrated in FIG. 4A and a case where the dimming member 40 is inserted as illustrated in FIG. 4B, the amounts of received light that increase due to the effect of the multiple reflection are 0.5% and 0.1%, and the difference between the amounts is 0.4%. In a state in which the dimming member 40 is inserted, the return light 1 from the optical member 90 passes through the dimming member 40 twice and reaches the light receiving sensors 13*b*, 14*b*, and 15*b*. Since the return light passes through the dimming member 40 twice, the intensity of the return light decreases. On the other hand, although the reflected light (return light 3) from the dimming member 40 is added, its intensity is lower than that of the return light 1 in FIG. 4A.

Figure 6A:
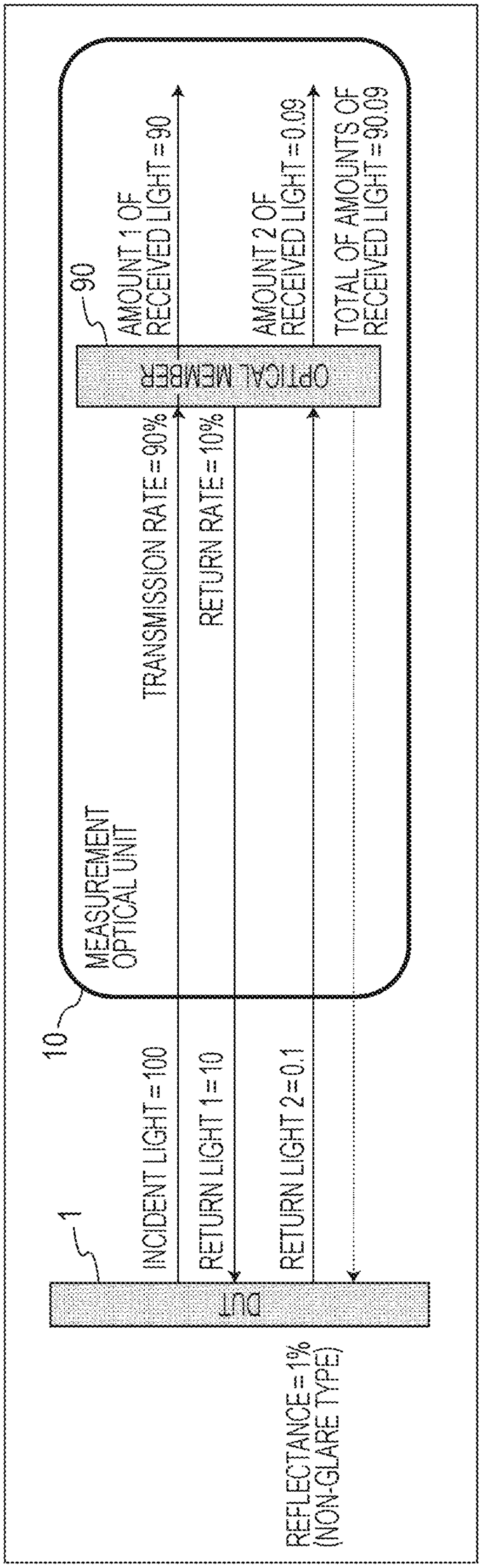
FIG. 6A is a schematic diagram for considering a state in which light to be measured from a non-glare type object to be measured enters the measurement optical unit of the photometric apparatus in a state in which the light attenuation member is not inserted in the light path of the light to be measured.

Next, as illustrated in the schematic diagram of FIG. 6A, the state of the light 2 to be measured in a state in which the dimming member 40 was not inserted in the light path was considered by using the non-glare type object 1 to be measured. The reflectance of the object 1 to be measured was set to 1%. Furthermore, the transmission rate and the return rate of the optical member 90 were the same as those of the optical member 90 used in FIG. 4A and FIG. 4B.

Under this condition, when incident light=100 from the object 1 to be measured enters the photometric apparatus 10, the light passing through the optical member 90 is received by the light receiving sensors 13*b*, 14*b*, and 15*b* as the amount 1 of the received light=90. The light reflected off the optical member 90 returns to the object 1 to be measured (return light 1=10). The return light 1 is reflected off the surface of the object 1 to be measured, becomes the return light 2=0.1, enters the optical member 90 again, and is received by the light receiving sensors 13*b*, 14*b*, and 15*b* as the amount 2 of the received light=0.09.

The total of the amount 1 of the received light and the amount 2 of the received light at the light receiving sensors 13*b*, 14*b*, and 15*b* is 90.09. Therefore, the ratio of the amount 2 of the received light, which is the amount of the received light due to the reflection off the optical member 90 and the reflection off the surface of the object 1 to be measured, to the amount 1 of the received light, in other words, the amount of the received light that increases due to the effect of the multiple reflection=0.09/90=0.10%.

Figure 6B:
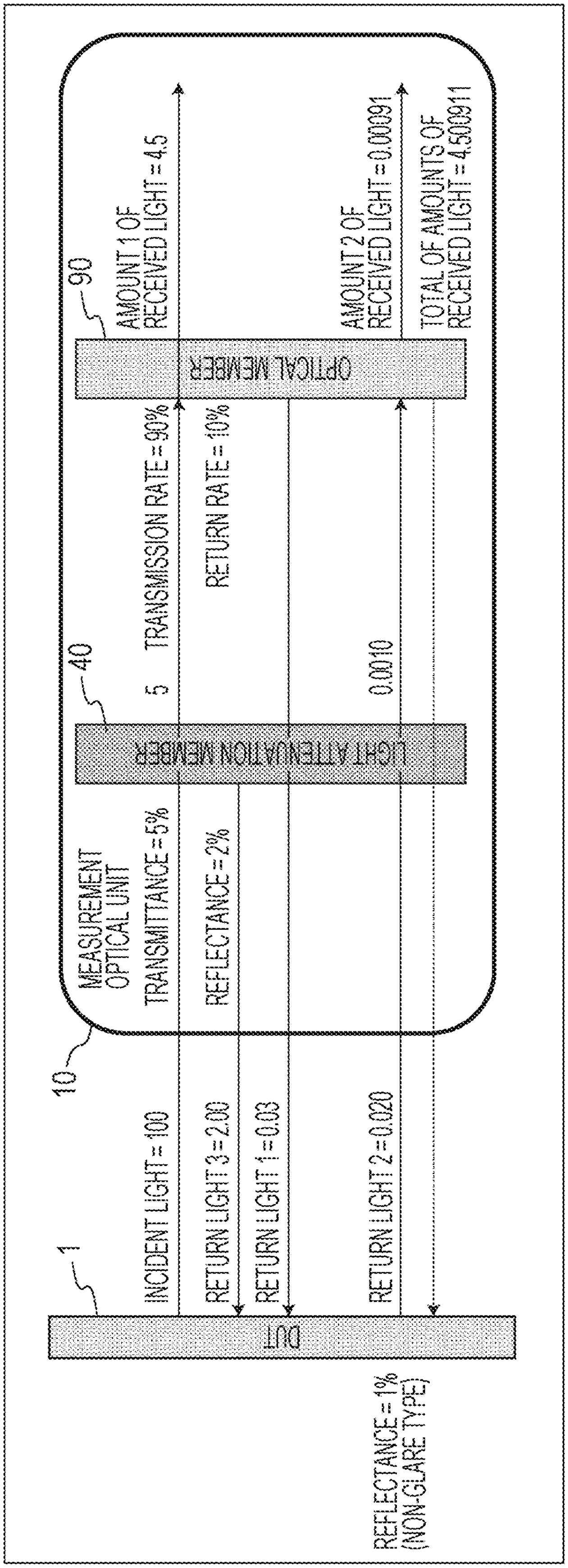
FIG. 6B is a schematic diagram for considering a state in which the light attenuation member is inserted in the light path of the light to be measured.

Next, a state in which the light 2 to be measured enters the photometric apparatus 10 in a state in which the dimming member 40 is inserted in the light path of the light 2 to be measured in front of the optical member 90 (between the object 1 to be measured and the optical member 90) will be considered with reference to the schematic diagram of FIG. 6B.

In FIG. 6B, the object 1 to be measured and the optical member 90 are the same as those in FIG. 6A. For the dimming member 40, the transmittance=5% and the reflectance=2%.

Under this condition, when the incident light=100 from the object 1 to be measured enters the photometric apparatus 10, the light passing through the dimming member 40 and the optical member 90 is received by the light receiving sensors 13*b*, 14*b*, and 15*b* as the amount 1 of the received light=4.5. Further, the light reflected off the optical member 90 returns to the object 1 to be measured through the dimming member 40 (return light 1=0.03). The light incident from the object 1 to be measured and reflected off the dimming member 40 also returns to the object 1 to be measured (return light 3=2.00). The return light 1 and the return light 3 that have returned to the object 1 to be measured are reflected off the surface of the object 1 to be measured, become the return light 2=0.020, pass through the dimming member 40 again, enter the optical member, and is received by the light receiving sensors 13*b*, 14*b*, and 15*b* as the amount 2 of the received light=0.00091.

The total of the amount 1 of the received light and the amount 2 of the received light at the light receiving sensors 13*b*, 14*b*, and 15*b* is 4.500911. Therefore, the ratio of the amount 2 of the received light, which is the amount of the received light due to the reflection off the optical member 90 and the reflection off the surface of the object 1 to be measured, to the amount 1 of the received light, in other words, the amount of the received light that increases due to the effect of the multiple reflection=0.00091/4.5=0.02%.

The state illustrated in FIG. 6A in which the non-glare type object 1 to be measured is used and the dimming member 40 is not inserted in the light path is compared with the state illustrated in FIG. 6B in which the non-glare type object 1 to be measured is used and the dimming member 40 is inserted in the light path. Then, the amounts of the received light that increase due to the effect of the multiple reflection are 0.10% and 0.02%, and the difference between the amounts of the received light is 0.08%.

Next, the relationship between a calibration light source and the object 1 to be measured will be considered.

In a case where the calibration light source and the object 1 to be measured are of the same type, an absolute value error does not occur regardless of whether the ND filter 40 is inserted or not inserted. Therefore, a deviation (linearity error) of a measured value at the time of switching between insertion and removal of the ND filter 40 does not occur.

Here, the "absolute value error" and the "linearity error" will be described.

The "absolute value error" refers to an error with respect to a "true value" of luminance or chromaticity. In many cases, a value measured by a high-precision photometric apparatus (for example, a spectral luminance meter) as a reference is set as a "true value".

Factors that cause the absolute value error are a degree of non-coincidence with the color-matching functions of the XYZ filters, a difference in measurement geometry (opening angle), and the like. In the case of luminance, for example, an absolute value error of less than ±2% is set as a product specification of the photometric apparatus 10.

The linearity error is an error in which continuity of measured values from low luminance to high luminance cannot be secured. In a case where "gamma measurement" is performed on a smartphone or the like, luminance and chromaticity are measured while brightness is continuously changed from low luminance (low gradation) to high luminance (high gradation).

Figure 7:
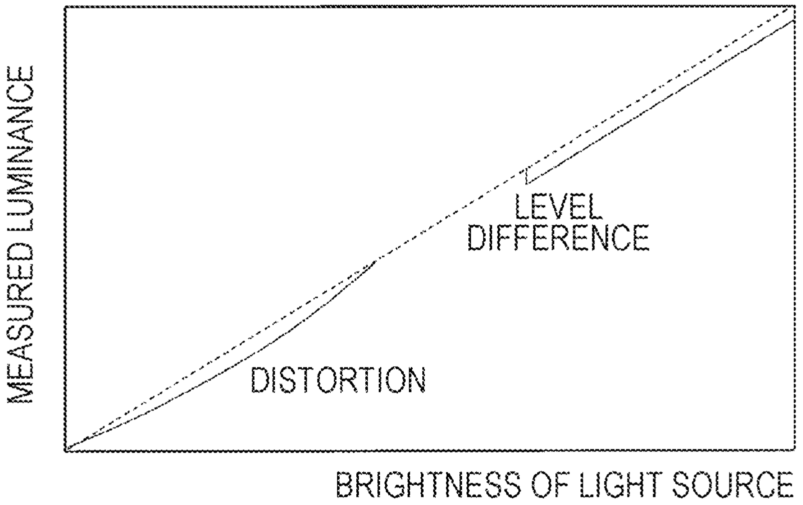
FIG. 7 is a graph for explaining a measurement error.

In this case, as illustrated by a broken line in FIG. 7, the brightness of the light source and the measured luminance values need to be a linear function. Linearity errors are a distortion and a level difference, as indicated by a solid line in FIG. 7. The linear distortion occurs due to the light receiving sensors 13*b*, 14*b*, and 15*b* and electrical processing. The level difference in linearity is caused by a change in amplification factor in electrical processing or insertion/removal of the ND filter 40. In the case of luminance values, for example, a linearity error of less than ±0.2% is set as a product specification of the photometric apparatus 10. Hereinafter, a linearity error which is a level difference is referred to as a linearity error (level difference caused by the ND filter).

On the other hand, in a case where the calibration light source and the object 1 to be measured are of different types, from the results illustrated in FIG. 4A, FIG. 4B, FIG. 6A, and FIG. 6B, an absolute value error obtained in a state in which the ND filter 40 is not inserted in the light path (hereinafter abbreviated as "without ND") is −0.4%. An absolute value error obtained in a state in which the ND filter 40 is inserted in the light path (hereinafter abbreviated as "with ND") is −0.08%, and a linearity error (level difference caused by the ND filter) of +0.32% occurs.

A specific example will be described below.

(1) In Case where Calibration is Performed Using Glare Type Light Source

A calibration coefficient without ND is Knon=the amount of incident light/the amount of received light=100/90.45, and a calibration coefficient with ND is Knd=the amount of incident light/the amount of received light=100/4.50456.

Measured values of the glare type object 1 to be measured that have been calibrated with the calibration coefficients are a measured value without ND=the amount of the received light×the calibration coefficient without ND=90.45×100/90.45=100 (an absolute error of 0%), and a measured value with ND=the amount of the received light×the calibration coefficient with ND=4.50456×100/4.50456=100 (an absolute error of 0%).

The difference between the measured value with ND and the measured value without ND (the measured value with ND−the measured value without ND)=100−100=0 (a linearity error (level difference caused by the ND filter) of 0%).

On the other hand, measured values of the non-glare type object 1 to be measured are a measured value without ND=the amount of received light×the calibration coefficient without ND=90.09×100/90.45=99.602 (an absolute error of −0.4%), and a measured value with ND=the amount of the received light×the calibration coefficient with ND=4.50091×100/4.50456=99.919 (an absolute error of −0.08%).

The difference between the measured value with ND and the measured value without ND (the measured value with ND−the measured value without ND)=99.919−99.602=0.3170 (a linearity error (level difference caused by the ND filter) of +0.32%).

(2) In Case where Calibration is Performed Using Non-Glare Type Light Source

In this case, the opposite to the case where the calibration is performed using the glare type light source occurs, and an absolute value error of +0.4% without ND and an absolute value error of +0.08% with ND occur in measured values of the glare type object 1 to be measured, and a linearity error (level difference caused by the ND filter) of −0.32% occurs.

(3) Relationship with Specifications of Photometric Apparatus (Precision Required by Customer)

The absolute value errors (−0.4% without ND and −0.08% with ND) occurring in the case of the above example are small compared to the product specification (±2%), so there is no problem. However, the linearity error (level difference caused by the ND filter) of +0.32% is larger than the product specification (±0.2%), which causes a problem.

As described above, a linearity error (level difference caused by the ND filter) occurs when the dimming member 40 is inserted or removed in accordance with whether the object 1 to be measured is a glare or non-glare object, in other words, in accordance with a difference in surface reflection characteristics between the objects 1 to be measured.

Solution

Figure 8A:
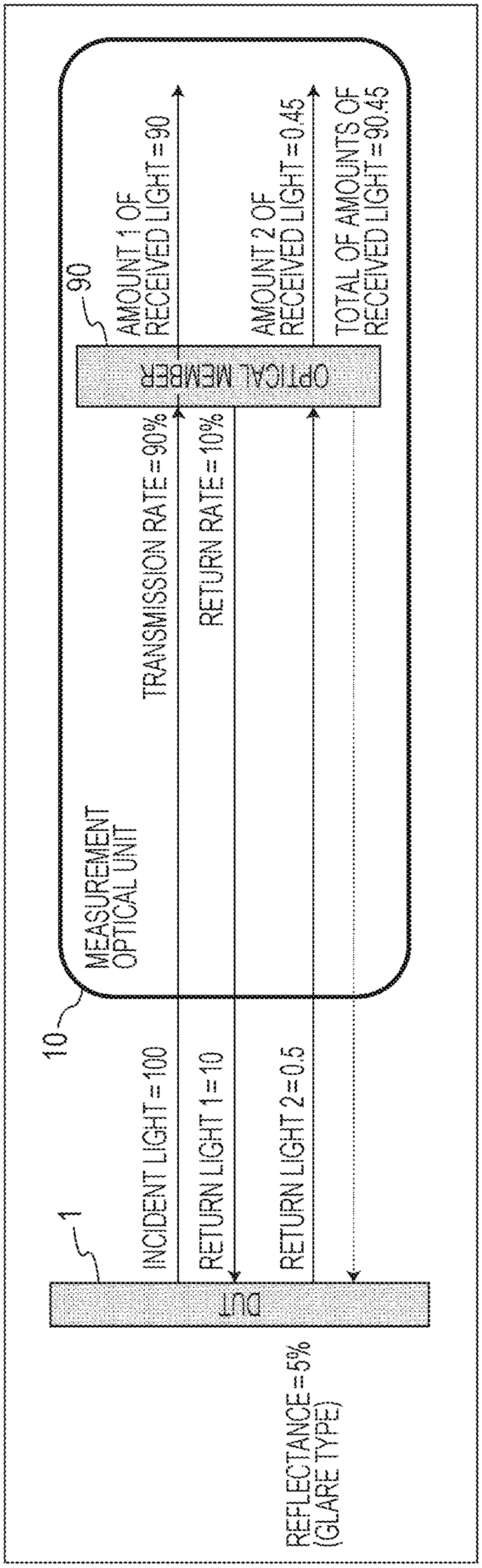
FIG. 8A is a schematic diagram for considering a state in which light to be measured from the glare type object to be measured enters the measurement optical unit of the photometric apparatus in a state in which a light attenuation member having a high surface reflectance is used and is not inserted in a light path of the light to be measured.
Figure 8B:
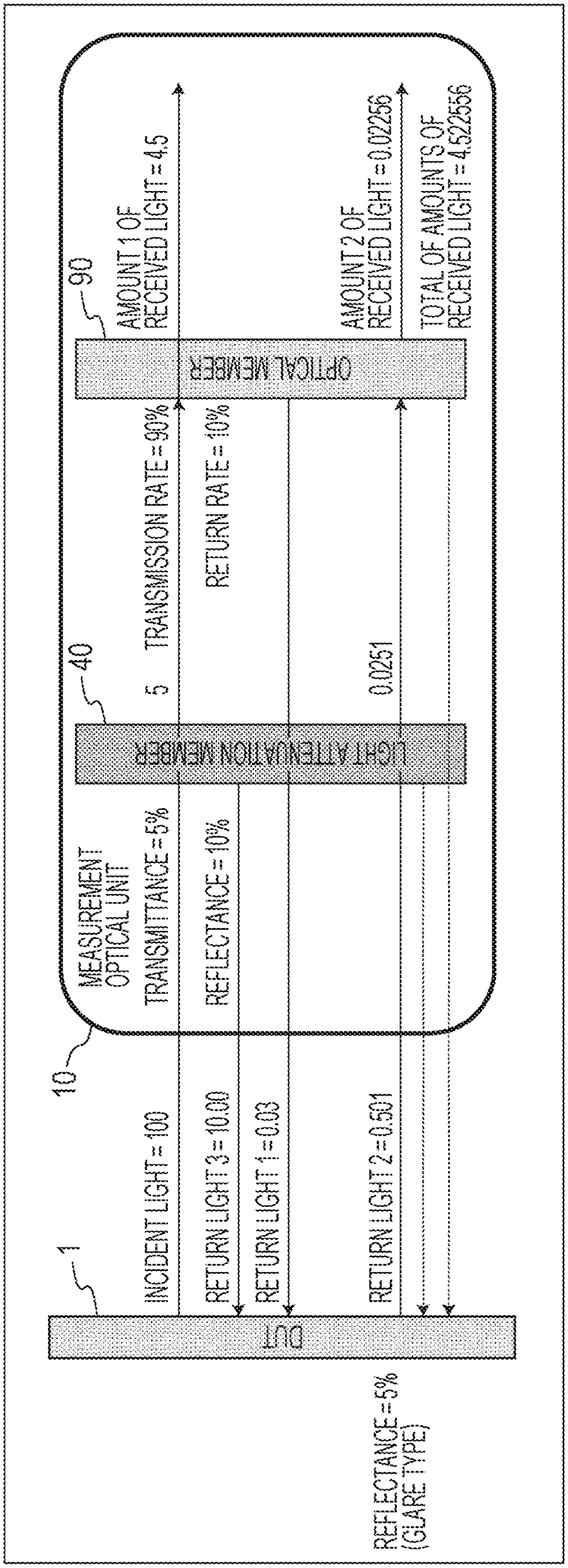
FIG. 8B is a schematic diagram for considering a state in which the dimming member is inserted in the light path of the light to be measured.

As illustrated in FIG. 8A and FIG. 8B, a portion having a reflective member on a surface on the front side, that is, on the object 1 (to be measured) side, was used as the dimming member 40, and the state of the light 2 to be measured was examined as in FIG. 4A, FIG. 4B, FIG. 6A, and FIG. 6B.

A glare object having a reflectance of 5% is used as the object 1 to be measured, and the intensity of incident light is set to 100. Furthermore, the optical member 90 of the photometric apparatus 10 has a transmission rate of 90% and a return rate of 10%.

FIG. 8A is a schematic diagram illustrating a state in which the dimming member 40 is not inserted in the light path of the light 2 to be measured. Since the conditions of the object 1 to be measured and the optical member 90 are the same as those in the case of FIG. 4A, the amount 1 of the received light=90, the amount 2 of the received light=0.45, and the total of the amount 1 of the received light and the amount 2 of the received light=90.45. Therefore, the ratio of the amount 2 of the received light, which is the amount of the received light due to reflection off the optical member 90 and the reflection off the surface of the object 1 to be measured, to the amount 1 of the received light, in other words, the amount of the received light that increases due to the effect of the multiple reflection=0.45/90=0.5%.

FIG. 8B is a schematic diagram illustrating a state in which the dimming member 40 having the reflective member on its surface is inserted in the light path of the light 2 to be measured. The transmittance of the dimming member 40 is 5%, and the reflectance of the dimming member 40 is 10% which is equal to or nearly equal to the return rate of the optical member 90.

Under this condition, when the incident light=100 from the object 1 to be measured enters the photometric apparatus 10, the light passing through the dimming member 40 and the optical member 90 is received by the light receiving sensors 13*b*, 14*b*, and 15*b* as the amount 1 of the received light=4.5. Further, the light reflected off the optical member 90 returns to the object 1 to be measured through the dimming member 40 (return light 1=0.03). The light incident from the object 1 to be measured and reflected off the dimming member 40 also returns to the object 1 to be measured (return light 3=10.00). The return light 1 and the return light 3 that have returned to the object 1 to be measured are reflected off the surface of the object 1 to be measured, become the return light 2=0.501, pass through the dimming member 40 again, enter the optical member 90, and are received by the light receiving sensors 13*b*, 14*b*, and 15*b* as the amount 2 of the received light=0.02256.

The total of the amount 1 of the received light and the amount 2 of the received light at the light receiving sensors 13*b*, 14*b*, and 15*b* is 4.5225564. Therefore, the ratio of the amount 2 of received light, which is the amount of the received light due to reflection off the optical member 90 and the reflection off the surface of the object 1 to be measured, to the amount 1 of the received light, in other words, the amount of the received light that increases due to the effect of the multiple reflection=0.02256/4.5=0.5%.

In comparison between the case where the dimming member 40 is not inserted as illustrated in FIG. 8A and the case where the dimming member 40 is inserted as illustrated in FIG. 8B, both of the amounts of the received light that increase due to the effect of the multiple reflection are the same value of 0.5%.

Figure 9A:
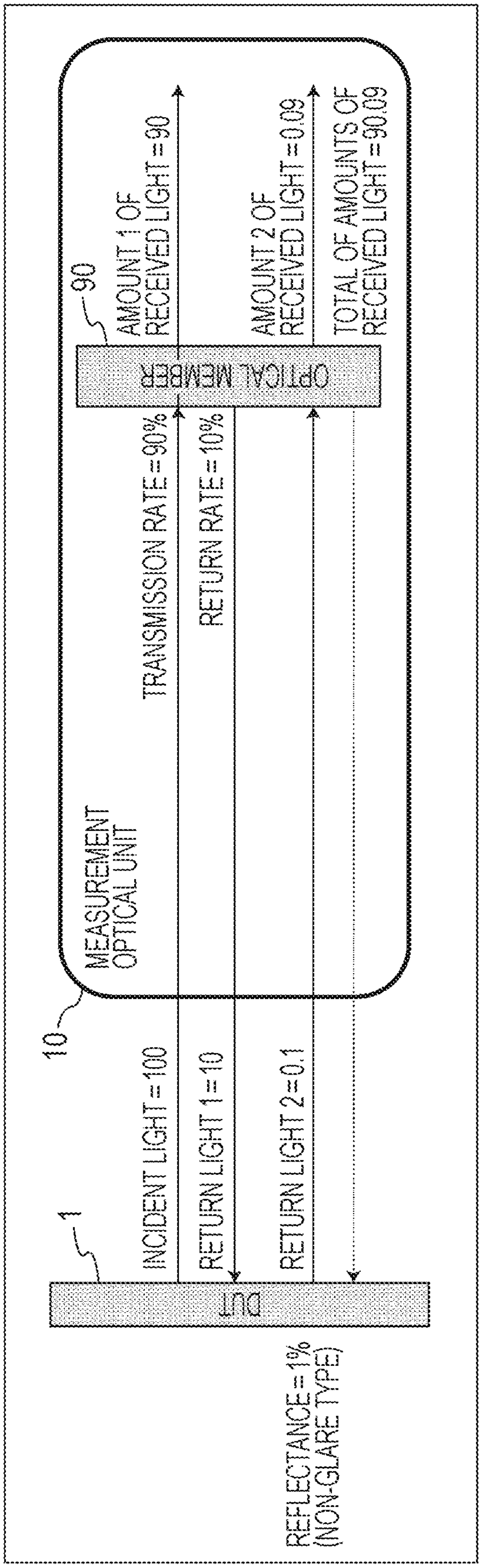
FIG. 9A is a schematic diagram for considering a state in which light to be measured from the non-glare type object to be measured enters the measurement optical unit of the photometric apparatus in a state in which the light attenuation member having a high surface reflectance is used and is not inserted in a light path of the light to be measured.

Next, as illustrated in the schematic diagram of FIG. 9A, the state of the light to be measured in a state in which the dimming member 40 is not inserted in the light path was considered using the non-glare type object 1 to be measured. The reflectance of the object 1 to be measured was set to 1%. Furthermore, the transmission rate and the return rate of the optical member 90 were the same as those of the optical device 90 used in FIG. 6A. Since the conditions of the object 1 to be measured and the optical member 90 are the same as those in the case of FIG. 6A, the amount 1 of the received light=90, the amount 2 of received light=0.09, and the total of the amount 1 of the received light and the amount 2 of the received light=90.09. Therefore, it is the ratio of the amount 2 of the received light, which is the amount of the received light due to reflection off the optical member and reflection off the surface of the object 1 to be measured, to the amount 1 of the received light, in other words, the amount of the received light that increases due to the effect of the multiple reflection=0.09/90=0.10%.

Figure 9B:
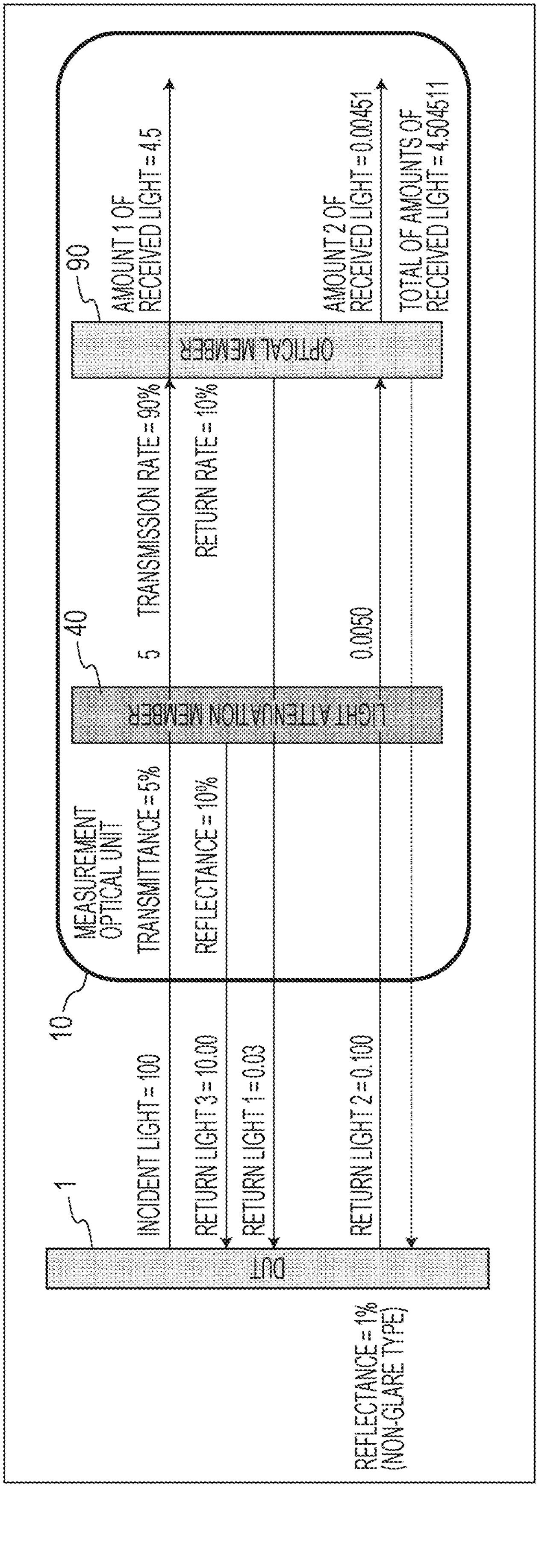
FIG. 9B is a schematic diagram for considering a state in which the dimming member is inserted in the light path of the light to be measured.

FIG. 9B is a schematic diagram illustrating a state in which the dimming member 40 is inserted in the light path of the light 2 to be measured. The dimming member 40 is the same as that in FIG. 8B, and has a transmittance of 5% and a reflectance of 10% that is equal to or nearly equal to the return rate of the optical member 90.

Under this condition, when the incident light=100 from the object 1 to be measured enters the photometric apparatus 10, the light passing through the dimming member 40 and the optical member 90 is received by the light receiving sensors 13*b*, 14*b*, and 15*b* as the amount 1 of the received light=4.5. Further, the light reflected off the optical member 90 returns to the object 1 to be measured through the dimming member 40 (return light 1=0.03). The light incident from the object 1 to be measured and reflected off the dimming member 40 also returns to the object 1 to be measured (return light 3=10.00). The return light 1 and the return light 3 that have returned to the object 1 to be measured are reflected off the surface of the object 1 to be measured, become the return light 2=0.100, pass through the dimming member 40 again, enter the optical member 90, and are received by the light receiving sensors 13*b*, 14*b*, and 15*b* as the amount 2 of received light=0.00451.

The total of the amount 1 of the received light and the amount 2 of the received light at the light receiving sensors 13*b*, 14*b*, and 15*b* is 4.504511. Therefore, the ratio of the amount 2 of the received light, which is the amount of the received light to the reflection off the optical member 90 and the reflection off the surface of the object 1 to be measured, to the amount 1 of the received light, in other words, the amount of the received light that increases due to the effect of the multiple reflection=0.00451/4.5=0.1%.

In comparison between the case where the dimming member 40 is not inserted as illustrated in FIG. 9A and the case where the dimming member 40 is inserted as illustrated in FIG. 9B, both of the amounts of the received light that increase due to the effect of the multiple reflection are the same value of 0.1%.

As understood from this, by forming the reflective member having the reflectance of 10% at the dimming member 40, the difference between the amount of the received light that increases due to the effect of the multiple reflection with ND and the amount of the received light that increases due to the effect of the multiple reflection without ND for the glare object was the same as that for the non-glare object.

Next, the relation between the calibration light source and the object 1 to be measured will be considered.

In a case where the calibration light source and the object 1 to be measured are of the same type, an absolute value error does not occur regardless of the presence or absence of the ND filter 40. Therefore, a linearity error (level difference caused by the ND filter) at the time of switching between the insertion and extraction of the ND filter also does not occur.

On the other hand, in a case where the calibration light source and the object 1 to be measured are of different types, from the results illustrated in FIGS. 8A, 8B, 9A, and 9B, an absolute-value error in a case where the ND filter is not inserted is −0.4%, an absolute value error in a case where the ND filter is inserted is −0.4%, and no linearity error (level difference caused by the ND filter) occur.

A specific example will be described below.

(1) In Case Where Calibration is Performed Using Glare Type Light Source

A calibration coefficient without ND is Knon=the amount of incident light/the amount of received light=100/90.45, and

- a calibration coefficient with ND is Knd=the amount of the incident light/the amount of the received light=100/4.52256.

Measured values of the glare type object 1 to be measured that have been calibrated with the calibration coefficients are

- a measured value without ND=the amount of the received light×the calibration coefficient without ND=90.45×100/90.45=100 (an absolute error of 0%) and
- a measured value with ND=the amount of the received light×the calibration coefficient with ND=4.52256×100/4.52256=100 (an absolute error of 0%).

The difference between the measured value with ND and the measured value without ND (the measured value with ND−the measured value without ND)=100−100=0 (a linearity error (level difference caused by the ND filter) of 0%).

On the other hand, measured values of the non-glare type object 1 to be measured are

- a measured value without ND=the amount of received light×the calibration coefficient without ND=90.09×100/90.45=99.602 (an absolute error of −0.4%), and
- a measured value with ND=the amount of the received light×the calibration coefficient with ND=4.50451×100/4.52256=99.601 (an absolute error of −0.4%).

The difference between the measured value with ND and the measured value without ND (the value with ND−the value without ND)=99.601−99.602=0.001 (a linearity error (level difference caused by the ND filter) of +0%).

(2) In Case Where Calibration is Performed Using Non-Glare Type Light Source

In this case, the opposite to the case where calibration is performed using the glare type light source occurs, and an absolute value error of +0.4% without ND and an absolute value error of +0.4% with ND occur in the measured values of the glare type object 1 to be measured, but a linearity error (level difference caused by the ND filter) does not occur (0%).

(3) Relationship with Specifications of Photometric Apparatus (Precision Required by Customer)

The absolute value errors (−0.4% without ND and −0.4% with ND) that occur in the case of the above example are small compared to the specification (±2%), so there is no problem. In addition, since the linearity error (level difference caused by the ND filter) is 0%, there is no problem.

In this way, the reflective member having a return rate equal to or nearly equal to that of the optical member 90 inside the photometric apparatus 10 is provided on the object 1 (to be measured) side, so that a linearity error (level difference caused by the ND filter) at the time of switching between insertion and removal of the dimming member 40 can be suppressed.

Here, an example of a method of measuring the transmission rate and the return rate of the optical member 90 will be described.

Regarding two photometric apparatuses A and B, it is assumed that the transmission rate of the optical member 90 of the photometric apparatus A is Top1, the return rate of the optical member 90 of the photometric apparatus A is Rop1, the transmission rate of the optical member 90 of the photometric apparatus B is Top2, the return rate of the optical member 90 of the photometric apparatus B is Rop2, the transmission rate of the optical member 90 of the photometric apparatus A is Top1=1−Rop1, and the return rate of the optical member 90 of the photometric apparatus A is Rop1.

(1) First, the sensitivity ratio C of the two photometric apparatuses A and B is obtained, and the ratio of the transmission rates of the photometric apparatuses A and B is calculated.

Figure 10A:
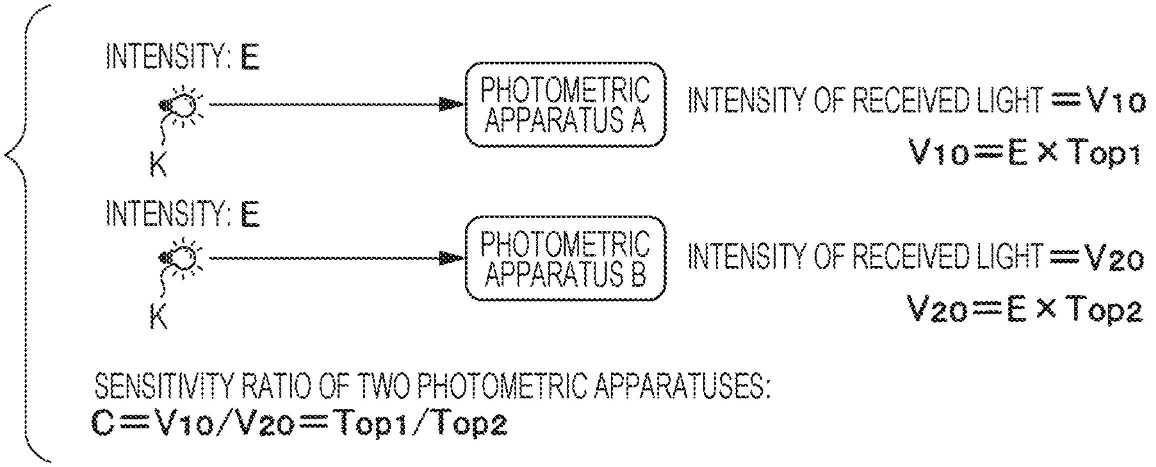
FIG. 10A and FIG. 10B are diagrams for explaining an example of a method of measuring a transmission rate and a return rate.

That is, as illustrated in FIG. 10A, when light having an intensity E is emitted from a light source K to the photometric apparatus A and the photometric apparatus B, the intensity V10 of the light received by the photometric apparatus A is E×Top1V, and the intensity V20 of the light received by the photometric apparatus B is E×Top2. Further, the sensitivity ratio C of the two photometric apparatuses is C=V10/V20=Top1/Top2.

(2) Next, a measured value is obtained by using a half mirror whose transmittance and reflectance are known.

Figure 10B:
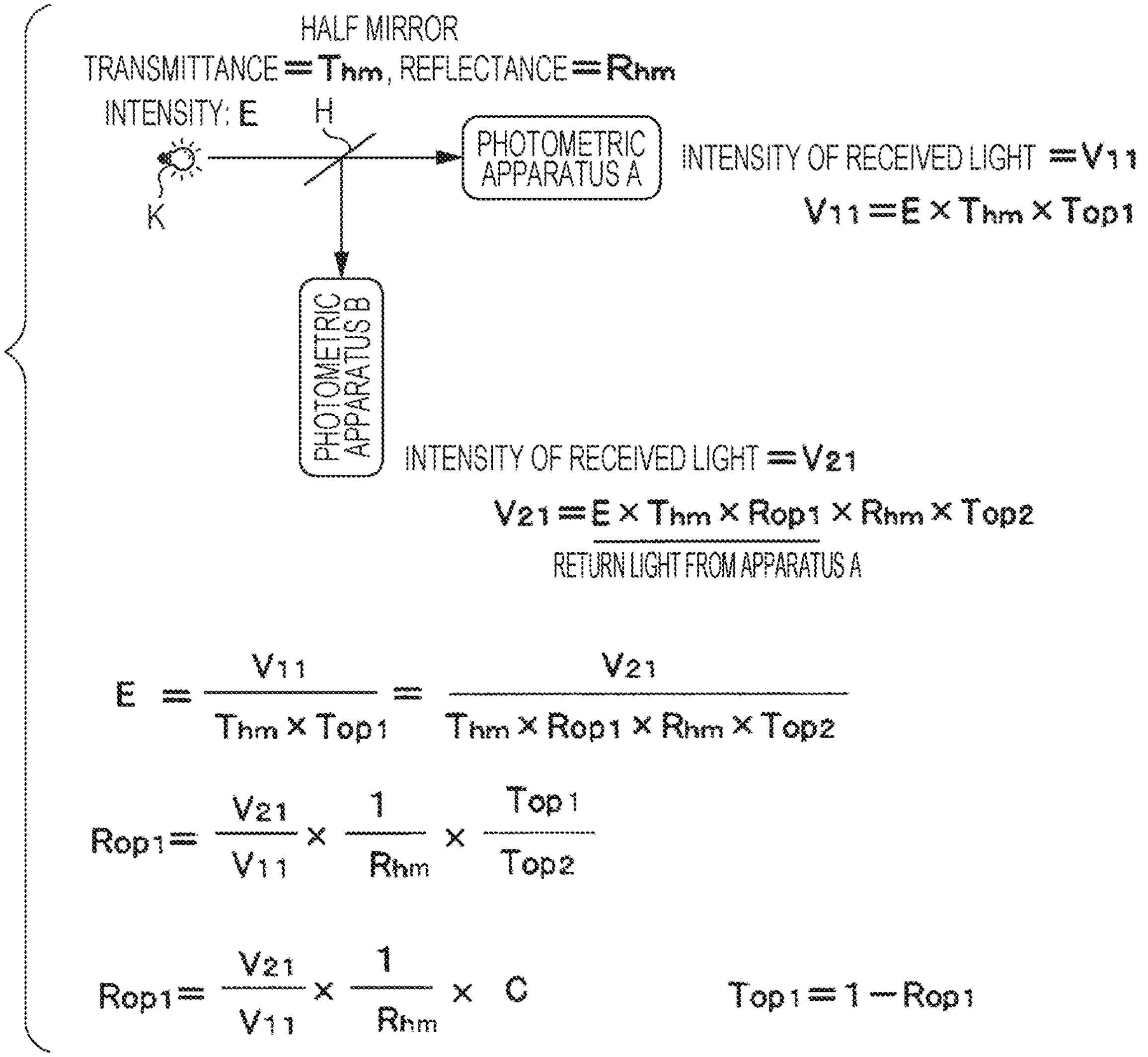

That is, as illustrated in FIG. 10B, a half mirror H having a transmittance Thm and a reflectance Rhm is disposed between the light source K and the photometric apparatus A. Then, return light from the photometric apparatus A is specularly reflected off the half mirror H and is subjected to photometry by the photometric apparatus B.

In this case, the intensity V11 of light received by the photometric apparatus A is=E×Thm×Top1, and the intensity V21 of light received by the photometric apparatus B is E×Thm×Rop1×Rhm×Top2. E×Thm×Rop1 of V21 indicates return light from the photometric apparatus A.

From the above-described V11 and V21, E=V11/(Thm×Top1)=V21/(Thm×Rop1×Rhm×Top2). From this equation, the return rate Rop1 of the optical member 90 of the photometric apparatus A is Rop1=(V21/V11)×(1/Rhm)×(Top1/Top2)=(V21/V11)×(1/Rhm)×C. The transmission rate of the optical member 90 of the photometric apparatus A is Top1=1−Rop1.

Next, an optimum value of the reflectance of the reflective member on the surface of the dimming member 40 is obtained.

The incident light is E, the reflectance of the object 1 to be measured is RDUT, the transmission rate and the return rate of the optical member 90 are Top and Rop, respectively, and the transmittance and the reflectance of the dimming member 40 are Tnd and Rnd, respectively.

In a state in which the attenuation member 40 is not inserted in the light path, the amount 1 of received light=E×Top and the amount 2 of received light=E×Rop×RDUT×Top. On the other hand, in a state in which the attenuation member 40 is inserted in the light path, the amount 1 of received light=E×Tnd×Top, the amount 2 of received light=E×Tnd×Rop×Tnd×RDUT×Tnd×Top, and the amount 3 of received light=E×Rnd×RDUT×Tnd×Top.

In a case where the ratio of the amounts of the received light=the amount of the received light with ND/the amount of the received light without ND=the transmittance of the ND filter (Equation [1]), a linearity error (level difference caused by the ND filter) is zero.

In a case where the total of the amount of the light received with ND and the amount of the light received without ND and the transmittance Tnd of the ND filter are substituted into Equation [1] to deform Equation [1], {(E×Top)+(E×Rop×RDUT×Top)}×Tnd=(E×Tnd×Top)+(E×Tnd×Rop×Tnd×RDUT×Tnd×Top)+(E×Rnd×RDUT×Tnd×Top).

Solving this equation for the reflectance Rnd of the dimming member 40, Rnd=Rop (1−Tnd^2) (Equation [2]).

In a case where the linearity error (level difference caused by the ND filter) is allowed up to ±Err %, the allowable range of the reflectance Rnd of the dimming member 40 is given by ⊿Rnd0=Err/RDUT.

Here, in a case where the linearity error is less than ±0.2% and the reflectance of a main smartphone is 5% or less, the allowable range of the reflectance (Rnd) of the dimming member 40 is ⊿Rnd0=Err/RDUT=0.002/0.05=0.04 under this condition. From the above, the preferable reflectance of the dimming member 40, that is, the reflectance of the reflective member is the optimum reflectance (Rnd0) ±4%=Rop×(1−Tnd^2)±4%.

A specific example of calculation of the reflectance will be described. For example, regarding the conditions of the photometric apparatus 10, when the return rate Rop of the internal optical member 90 is 10% and the transmittance Tnd of the light attenuation member 40 is 5%, the optimum reflectance of the dimming member (reflective member) is Rnd0=Rop×(1−Tnd^2)=0.1×(1−0.05^2)=9.4%.

In order to obtain a linearity error (level difference caused by the ND filter) of 0.2% or less in a main smartphone (reflectance of 5% or less), the reflectance of the dimming member (reflective member) is preferably set to a range of 5.4% to 13.4%.

In a case where the dimming member 40 is a thin film filter, the reflective member may be formed of a thin film integrally formed on a surface of the reflective member. In particular, the reflectance is preferably controlled by the thin film on the front surface side, that is, the object 1 (to be measured) side. Since the film configuration also affects the transmittance, it is necessary to have a film configuration that makes both transmission and reflection appropriate.

Further, the reflective member may be constituted by the surface of the glass absorption filter. Alternatively, another reflective member may be formed integrally with the dimming member 40.

Alternatively, the reflective member may be formed as a separate component from the dimming member 40, and the reflective member may be arranged in a state of being separated from the dimming member 40. An embodiment in which the reflective member is formed of a separate component from the dimming member 40 will be described later.

Figure 11A:
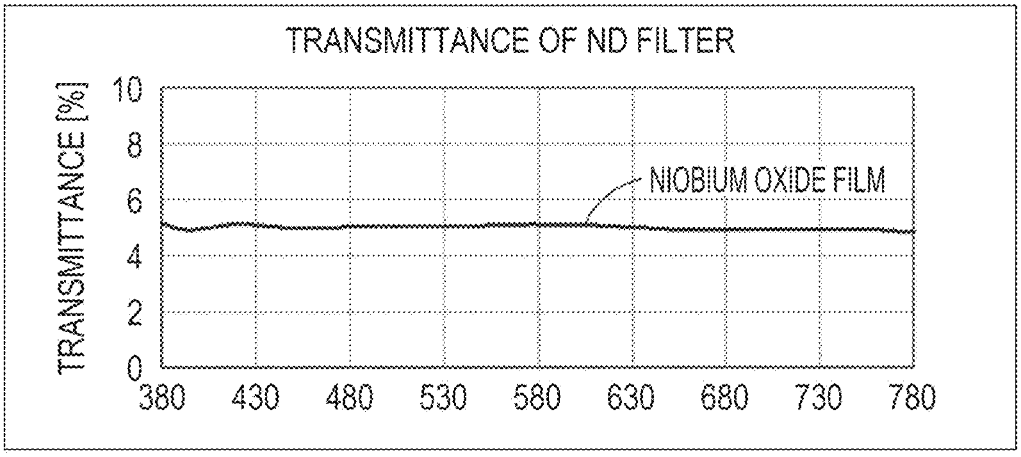
FIG. 11A is a graph illustrating the transmittance of a light attenuation member including a thin film filter in which a thin film is a niobium oxide film in the visible light range.

FIG. 11A illustrates the transmittance of the ND filter 40 formed of a thin film filter in which a thin film is a niobium oxide film in the visible light range (380 to 780 nm). The average transmittance is 5%.

Figure 11B:
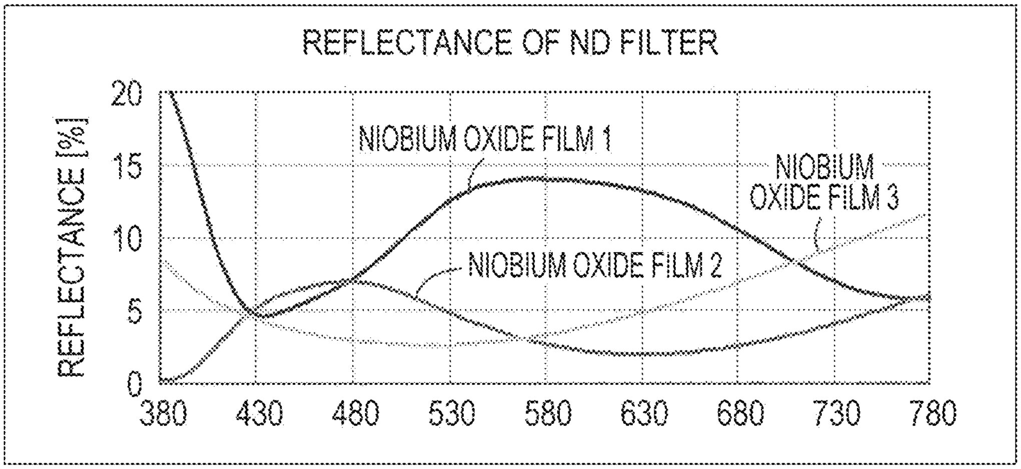
FIG. 11B is a graph illustrating the reflectance of a light attenuation member including a thin film filter having three types of thin films, a first niobium oxide film, a second niobium oxide film, and a third niobium oxide film in the visible light range.

FIG. 11B illustrates the reflectance of the ND filter 40 formed of a thin film filter having three kinds of thin films, a niobium oxide film 1, a niobium oxide film 2, and a niobium oxide film 3 in the visible light range. The average reflectance of the thin film filter of the niobium oxide film 1 is 10%, and the average reflectance of each of the thin film filters of the niobium oxide films 2 and 3 is 5%.

When such niobium oxide films are combined to form a multilayer film, the reflectance is controlled.

Figure 12A:
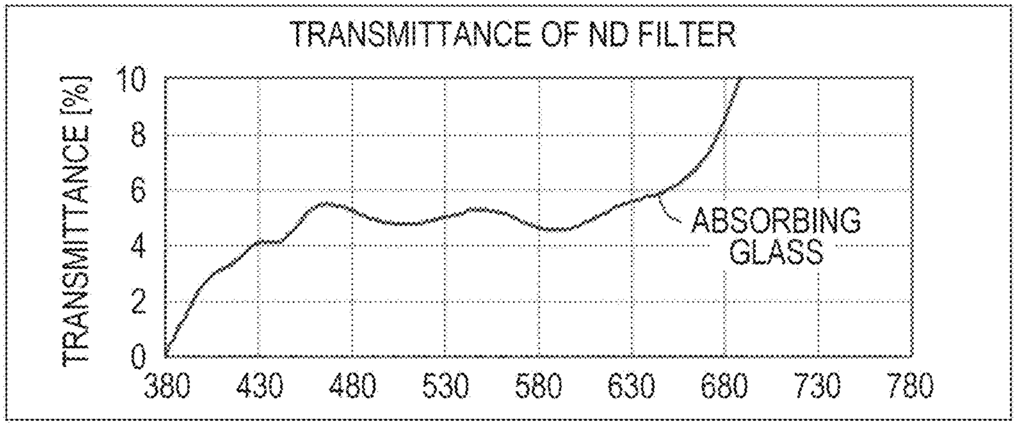
FIG. 12A, FIG. 12B, and FIG. 12C are graphs illustrating the transmittance of a light attenuation member including a glass absorption filter in the visible light range, the reflectance of a light attenuation member in which a single-layer antireflection film is formed, and the reflectance of a light attenuation member in which no antireflection film is present and only a protective film is present.
Figure 12B:
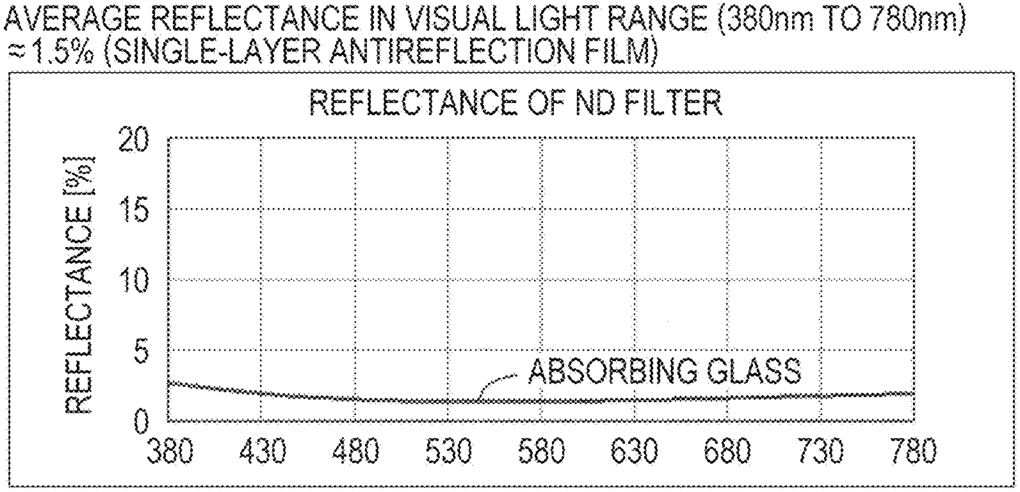
Figure 12C:
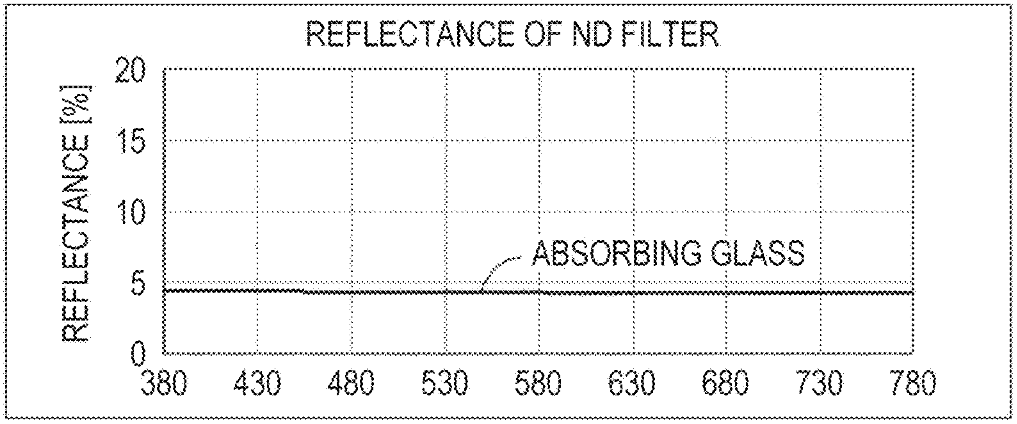

FIG. 12A, FIG. 12B, and FIG. 12C illustrate the transmittance of the ND filter 40 formed of the glass absorption filter in the visible light range, the reflectance in a state in which the single-layer antireflection film is formed, and the reflectance in a case where no antireflection film is present and only a protective film is present, respectively. The average transmittance in the case illustrated in FIG. 12A is 5%, the average reflectance in the case illustrated in FIG. 12B is 1.5%, and the average reflectance in the case illustrated in FIG. 12C is 4.5%.

As described above, according to this embodiment, the occurrence of a linearity error (level difference caused by the ND filter) whose magnitude varies depending on the characteristics such as the reflectance on the surface of the object 1 to be measured is prevented by the reflective member formed integrally with the ND filter 40 or the reflective member formed as a component separate from the ND filter 40. In other words, regardless of the characteristics of the object 1 to be measured, a difference in the measured values due to the linearity error (level difference caused by the ND filter), that is, a difference between the measured values in the state in which the ND filter 40 is not inserted in the light path of the light to be measured and the measured values in the state in which the ND filter 40 is inserted in the light path of the light to be measured can be corrected by the reflective member.

First Modification Example

Figure 13:
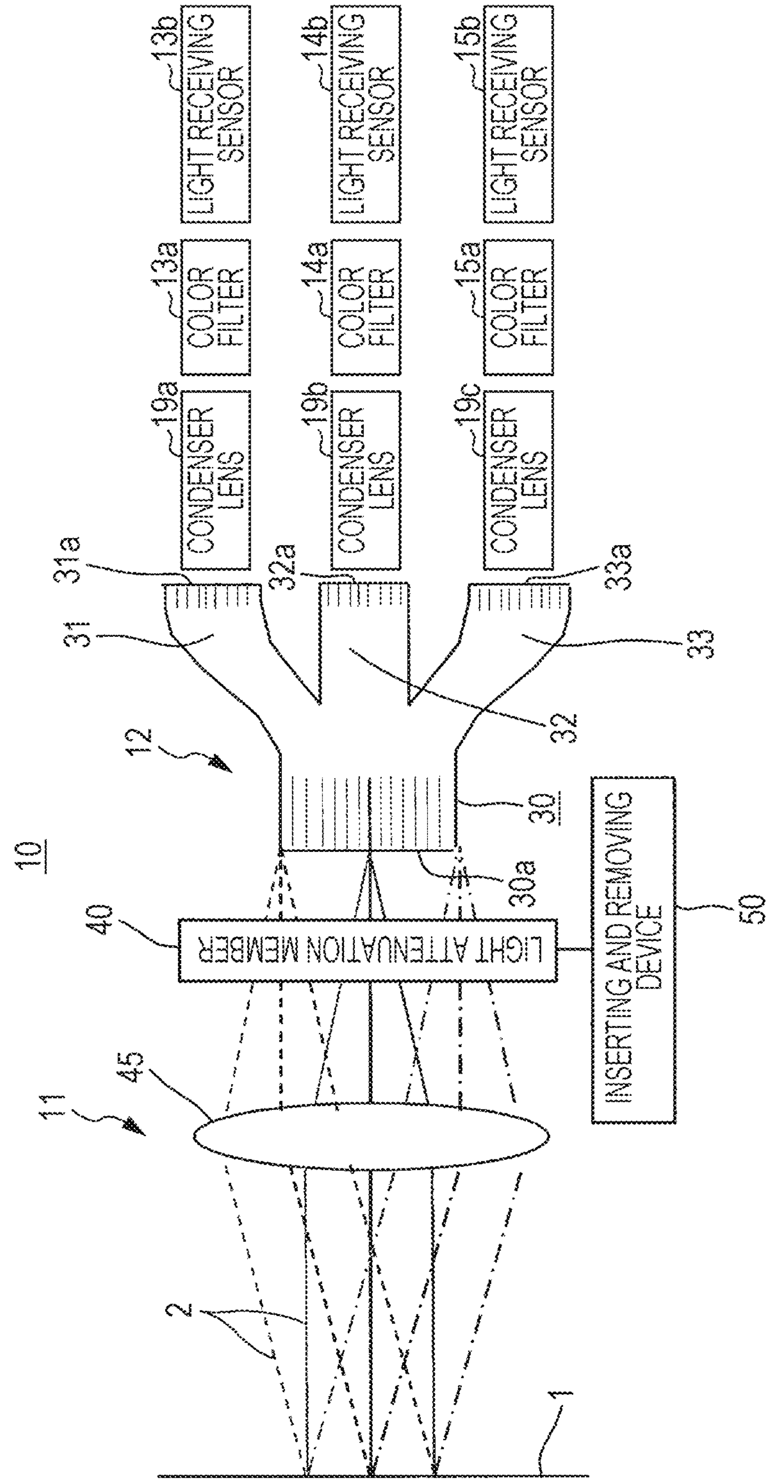
FIG. 13 is a configuration diagram of a photometric apparatus according to a first modification example.

In a first modification example, as illustrated in FIG. 13, a bundle fiber 30 is used in place of the diffuser plate 20 serving as the splitting optical system 12 in the first embodiment. No aperture diaphragm 11*b* is provided. Note that the aperture diaphragm 11*b* may be provided. In addition, condenser lenses 19*a* to 19*c* are disposed between emission ends of the bundle fiber 30 and color filters.

The other configurations such as the ND filter 40, the inserting and removing device 50, the color filters 13*a*, 14*a*, and 15*a*, the light receiving sensors 13*b*, 14*b*, and 15*b*, the electrical processing sections 16*a* to 16*c*, and the controller

17 are substantially the same as those described in the first embodiment as illustrated in FIG. 1, and therefore, the same reference signs are given and a description thereof is omitted. In FIG. 13, an illustration of the electrical processing sections 16*a*, 16*b*, 16*c* and the controller 17 is omitted.

The bundle fiber 30 is formed by bundling strand fibers having small diameters (φ=about 0.03 to 0.3 mm). The plurality n (n=several hundred to several thousand) of strand fibers are bundled on the entrance side, randomly branched into a plurality (three corresponding to the tristimulus values of X, Y, and Z in this embodiment) of pieces on the exit side, and the pieces are bundled in groups of a number m of pieces. Reference signs 31, 32, and 33 indicate branch portions. The shapes of an incident end 30*a* and the emission ends 31*a*, 32*a*, and 33*a* of the respective branch portions 31, 32, and 33 are arbitrary (circular, rectangular, or the like).

In the photometric apparatus 10 illustrated in FIG. 13, a part of the light 2 to be measured that has been reflected from the object 1 to be measured and has passed through the objective optical system 11 returns to the object 1 (to be measured) side by the reflective member of the ND filter 40. By adjusting the reflectance of the reflective member of the ND filter 40, the occurrence of a linearity error (level difference caused by the ND filter) is prevented.

Further, similarly to the photometric apparatus 10 according to the first embodiment illustrated in FIG. 1, the objective optical system 11 is a front telecentric optical system in the photometric apparatus 10 illustrated in FIG. 13. In a case where the objective optical system 11 is a front telecentric optical system, a large amount of light reflected off the surface of the object 1 to be measured returns to the photometric apparatus 10.

Figure 14A:
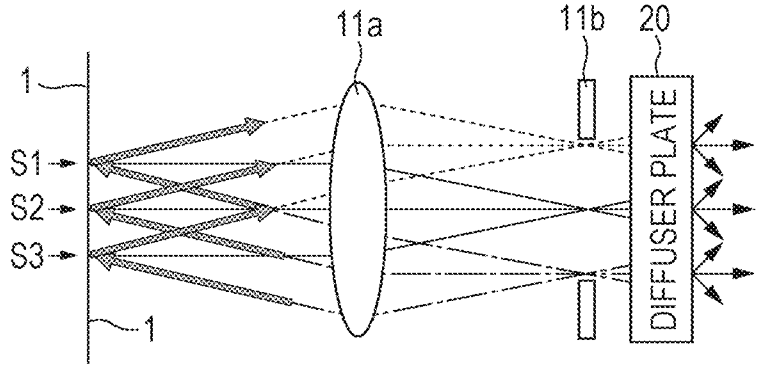
FIGS. 14A and 14B are diagrams for explaining a case where an objective optical system is a front telecentric optical system.

That is, in a case where the front telecentric optical system is used, as illustrated in S1 to S3 in FIG. 14A, light returned at an angle of 0 degrees to the object 1 (to be measured) side is specularly reflected off the object 1 to be measured and returned to the photometric apparatus 10 at an angle of 0 degrees. Light returned to the object 1 side at an angle of +2.5 degrees is reflected off the object and returns to the photometric apparatus 10 at an angle of −2.5 degrees. That is, since the objective optical system 11 is the front telecentric optical system, light of all angular components returns to the photometric apparatus 10. In FIG. 14A, an illustration of the light attenuation member 40 and the inserting and removing device 50 is omitted.

Figure 14B:
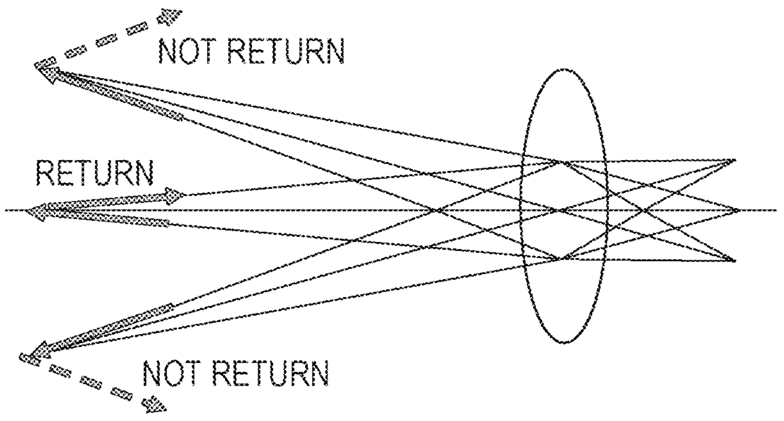

On the other hand, in a case where the objective optical system 11 is not a front telecentric optical system and is a general camera lens or the like, as illustrated in FIG. 14B, light around a measurement area is angled and therefore does not return to the photometric apparatus 10.

Second Modification Example

In a second modification example, a finder optical system for a measurer to visually recognize the periphery of an area to be measured is used.

Figure 15:
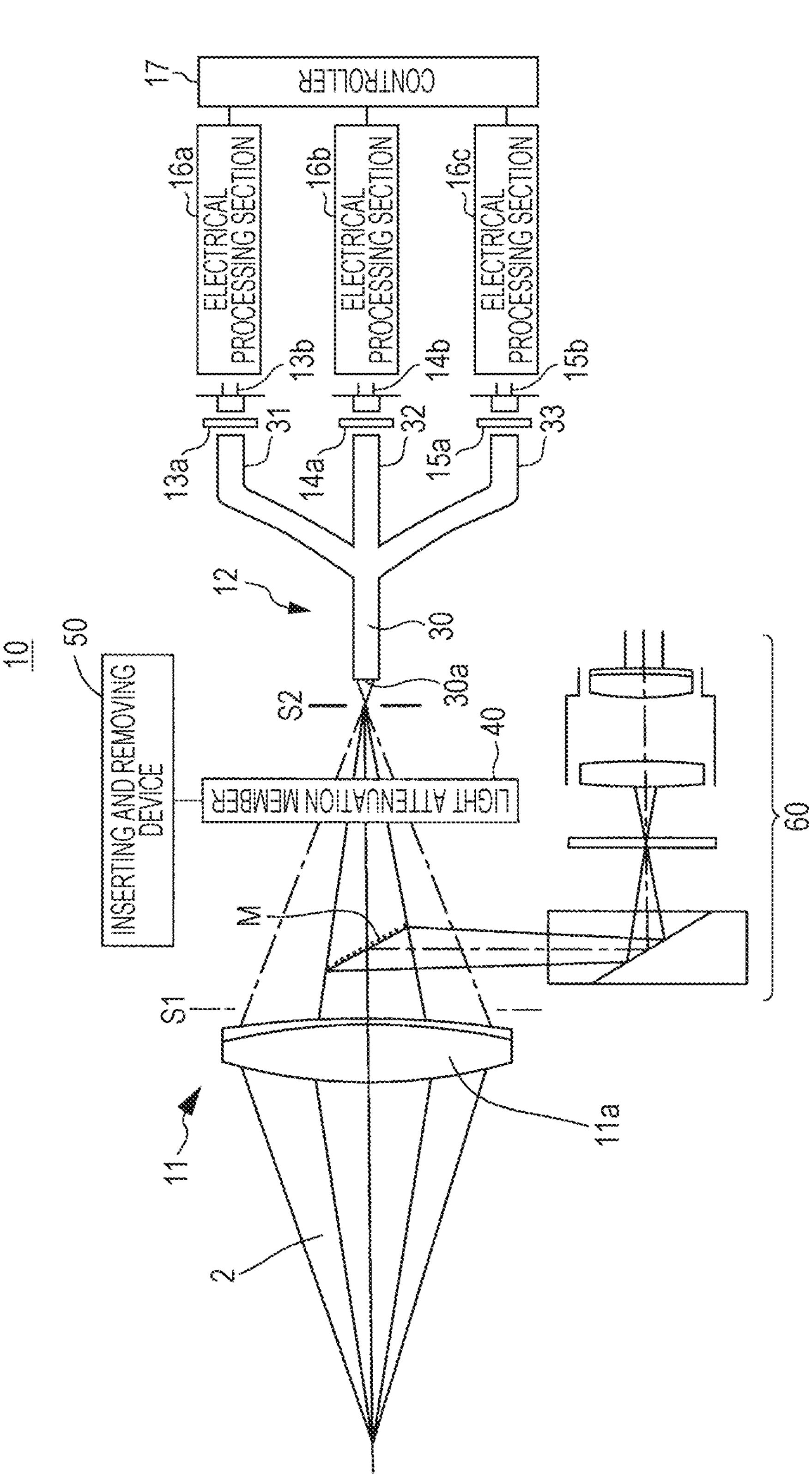
FIG. 15 is a configuration diagram of a photometric apparatus according to a second modification example.

That is, as illustrated in FIG. 15, a mirror M for bending a part of the light path is disposed between the objective optical system 11 and the incident end 30*a* of the splitting optical system 12 (bundle fiber 30). A light flux which is not reflected off the mirror M is guided to the splitting optical system 12 and the light receiving sensors 13*b*, 14*b*, and 15*b*, and measurement of luminance, chromaticity, and the like is performed. On the other hand, a light flux reflected off the mirror M is guided to the finder optical system 60, so that the measurer can visually recognize the periphery of the area to be measured. In FIG. 15, reference signs S1 and S2 indicate slits.

In a case where the ND filter 40 is disposed in front of the mirror M, the ND filter 40 is inserted or removed in accordance with the brightness of the object 1 to be measured, and thus it is difficult for the measurer to visually recognize the ND filter 40. For this reason, the ND filter 40 is preferably disposed behind the mirror M.

The second modification example is substantially the same as the first modification example except that the objective optical system 11 is not a front telecentric optical system, and the finder optical system 60, the mirror M, and the slits S1 and S2 are provided, and therefore, a description thereof is omitted. Also, in FIG. 15, an illustration of the condenser lenses 19*a*, 19*b*, 19*c* at the back of the bundle fiber 30 is omitted. Furthermore, the diffuser plate 20 may be used instead of the bundle fiber 30.

Third Modification Example

Figure 16:
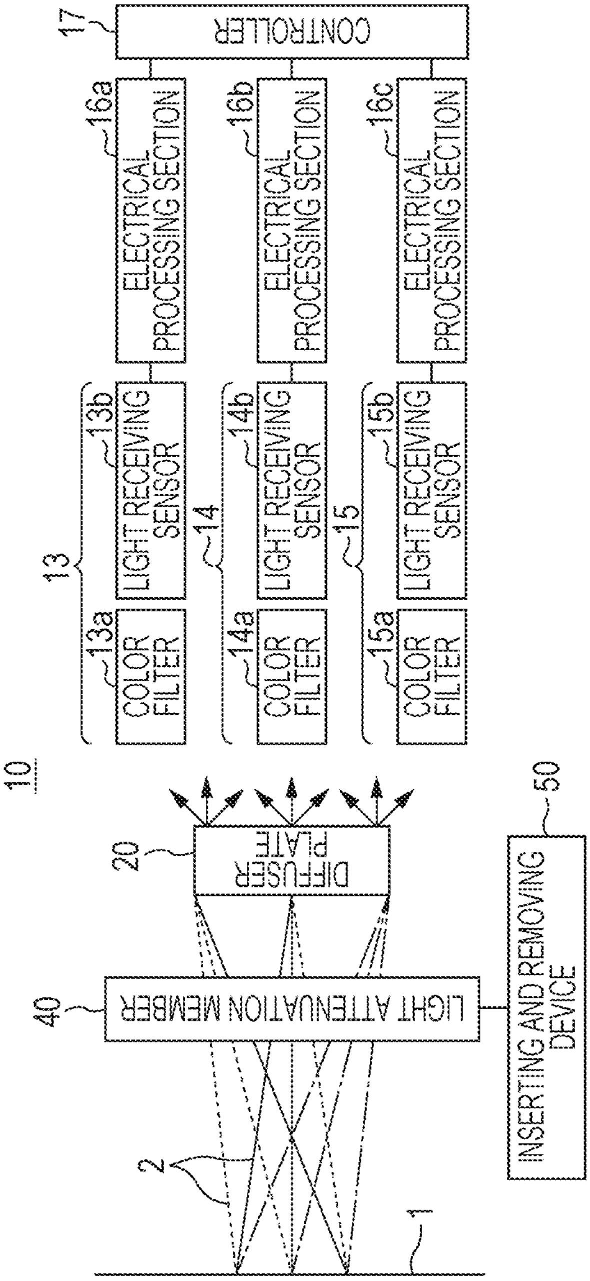
FIG. 16 is a configuration diagram of a photometric apparatus according to a third modification example.

In a third modification example, as illustrated in FIG. 16, the convex lens 11*a* and the aperture diaphragm 11*b* which are the objective optical system 11 are omitted in the photometric apparatus 10 according to the first embodiment illustrated in FIG. 1. Therefore, the light 2 to be measured from the object 1 to be measured directly enters the ND filter 40.

The configuration is substantially the same as that described in the first embodiment illustrated in FIG. 1 except that the objective optical system 11 is not present, and therefore, a description thereof is omitted. Note that the bundle fiber 30 may be used instead of the diffuser plate 20.

Fourth Modification Example

In a fourth modification example, the configuration of the colorimetric optical system 13 in the photometric apparatus 10 according to the first embodiment in FIG. 1 is changed.

Figure 17:
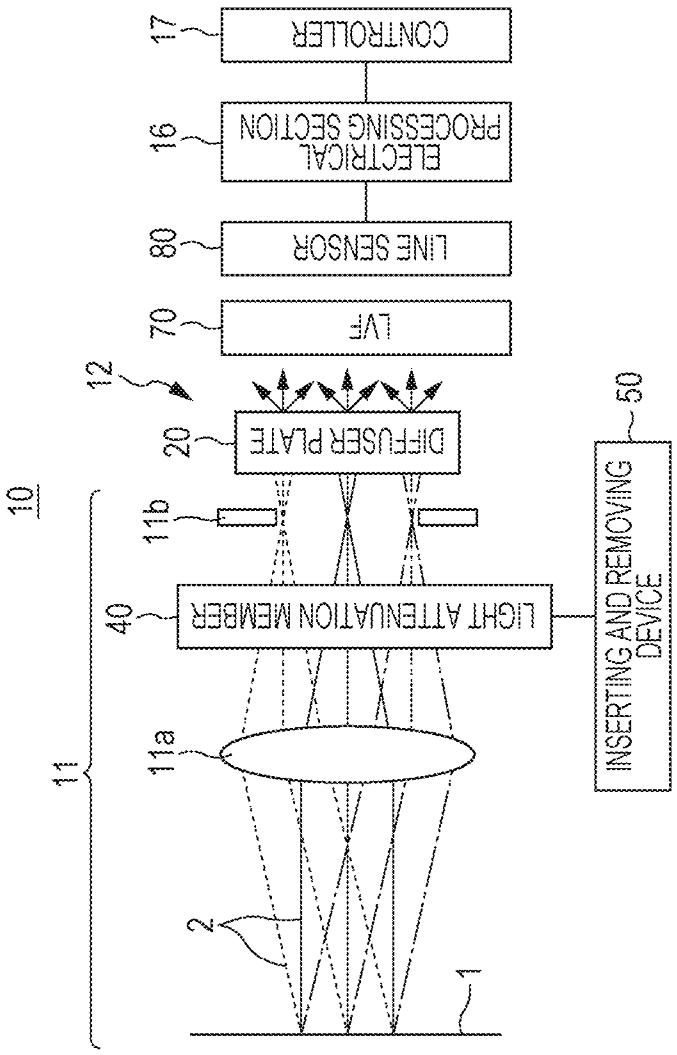
FIG. 17 is a configuration diagram of a photometric apparatus according to a fourth modification example.

That is, as illustrated in FIG. 17, a linear variable filter (LVF) 70 which is a spectral filter capable of continuously varying wavelengths is used in place of the three color filters 13*a*, 14*a* and 15*a*. A line sensor 80 is used as a light receiving sensor. However, instead of the line sensor 80, a plurality of light receiving sensors may be arranged and used.

The configurations other than the colorimetric optical systems 13, 14, and 15 are substantially the same as those illustrated in the first embodiment illustrated in FIG. 1, and thus a description thereof will be omitted.

Note that the bundle fiber 30 may be used instead of the diffuser plate 20.

Fifth Modification Example

Figure 18:
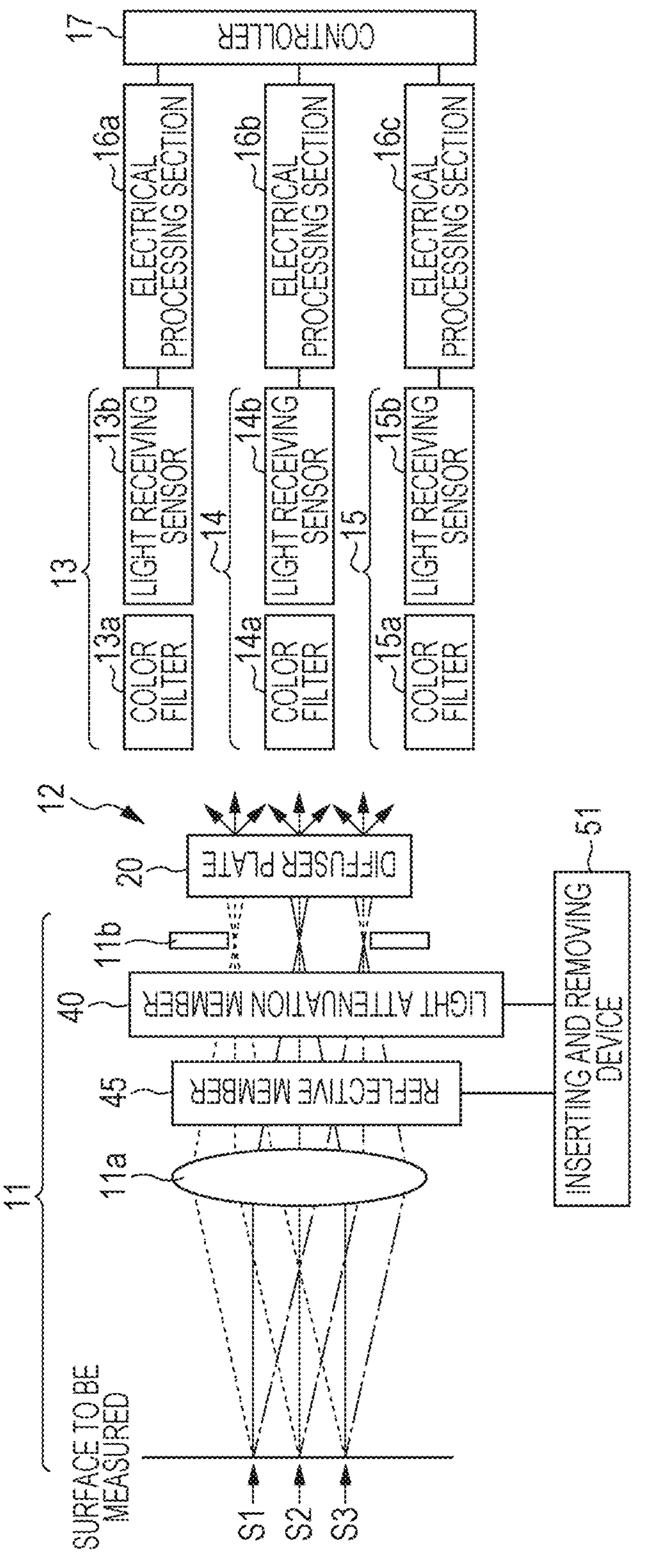
FIG. 18 is a configuration diagram of a photometric apparatus according to a fifth modification example.

In a fifth modification example, as illustrated in FIG. 18, a reflective member 45 which is a separate component from the ND filter 40 is disposed in front of the ND filter 40 (on the object 1 (to be measured) side). Further, the ND filter 40 and the reflective member 45 are simultaneously inserted into and removed from the light path of the light 2 to be measured by one common inserting and removing device 51.

Figure 19A:
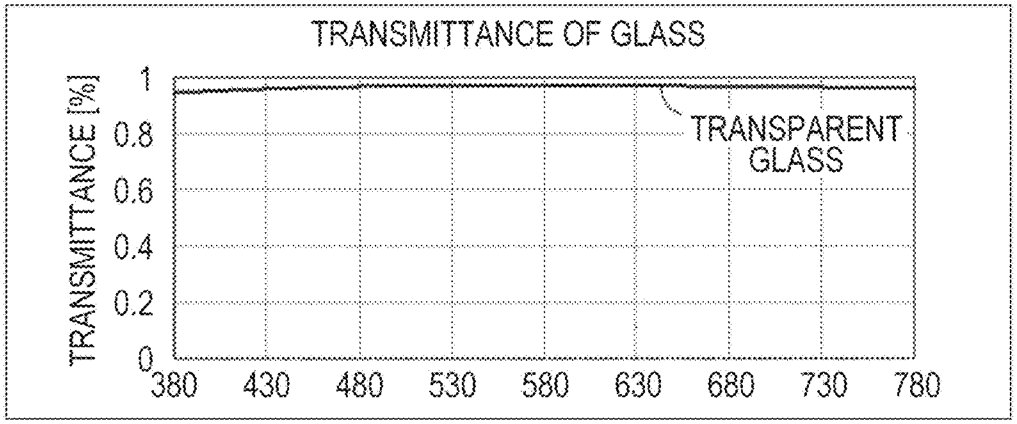
FIG. 19A, FIG. 19B, and FIG. 19C are graphs each illustrating the transmittance of transparent glass in the visible light range, the reflectance of transparent glass in which a single-layer antireflection film is formed, and the reflectance of transparent glass in which no antireflection film is present and only a protective film is present.
Figure 19B:
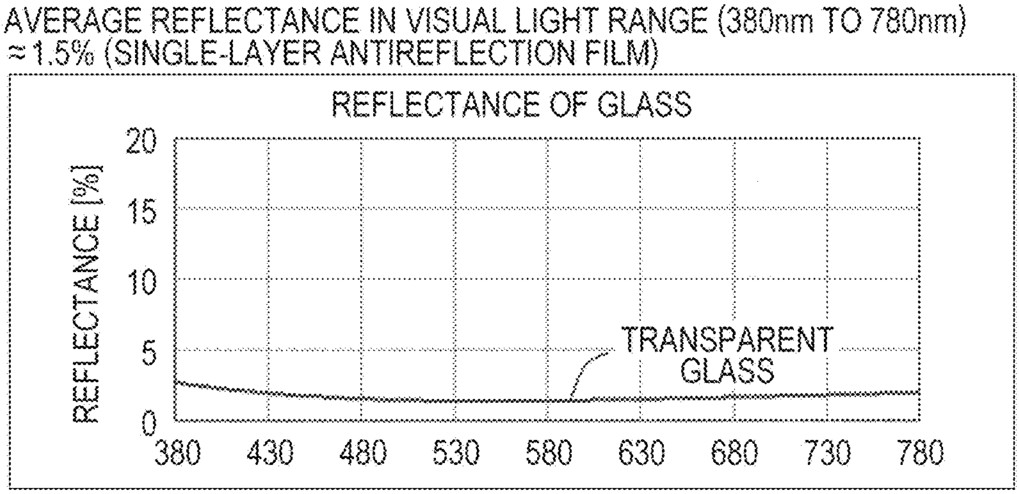
Figure 19C:
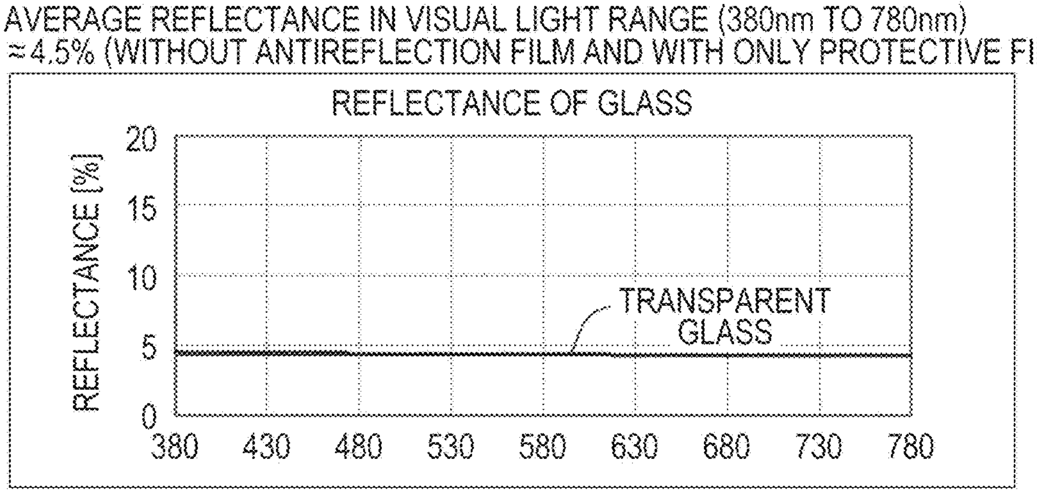

Examples of the reflective member 45 include transparent glass. FIG. 19A, FIG. 19B, and FIG. 19C illustrate the transmittance of the transparent glass in the visible light range, the reflectance of the transparent glass in a state in which a single-layer antireflection film is formed, and the reflectance of the transparent glass in a case where no antireflection film is present and only a protective film is present, respectively. The average transmittance in the case illustrated in FIG. 19A is 95%, the average reflectance in the case illustrated in FIG. 19B is 1.5%, and the average reflectance in the case illustrated in FIG. 19C is 4.5%. As the ND filter 40, a thin film filter or the like having a low reflectance may be used.

Note that the configurations other than the ND filter 40, the reflective member 45, and the insertion and removal device 51 are substantially the same as those described in the first embodiment illustrated in FIG. 1.

Sixth Modification Example

Figure 20:
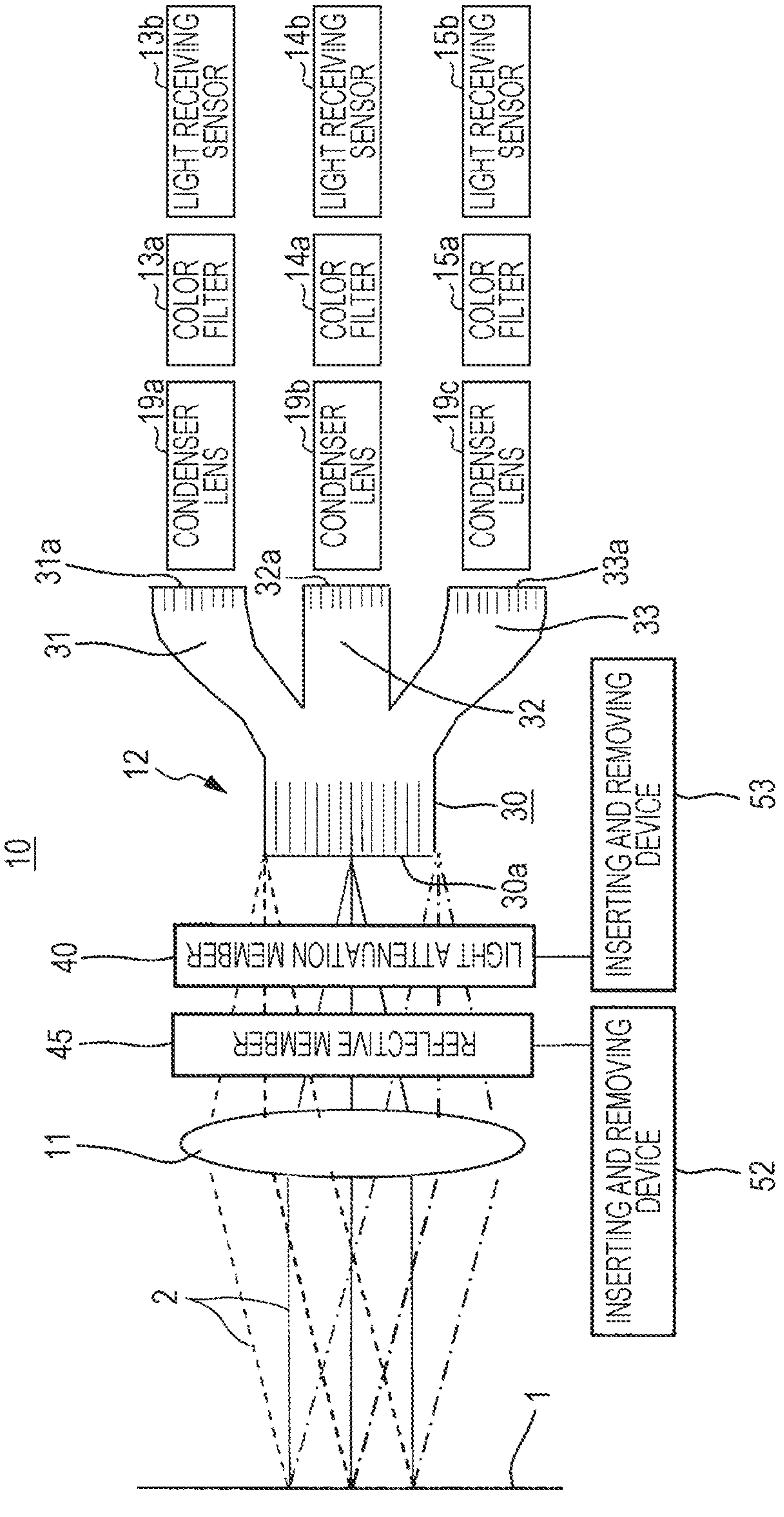
FIG. 20 is a configuration diagram of a photometric apparatus according to a sixth modification example.

In a sixth modification example, as illustrated in FIG. 20, the reflective member 45 which is a separate component from the ND filter 40 is disposed in front of the light attenuation member 40 (on the object 1 (to be measured) side). Further, the ND filter 40 and the reflective member 45 are driven to be inserted into and removed from the light path of the light to be measured 2 in synchronization with each other by different inserting and removing devices 52 and 53, respectively.

Note that the configurations other than the ND filter 40, the reflective member 45, and the inserting and removing devices 52 and 53 are substantially the same as those described in the first modification example illustrated in FIG. 13.

Control of Insertion and Removal of ND Filter

Figure 21:
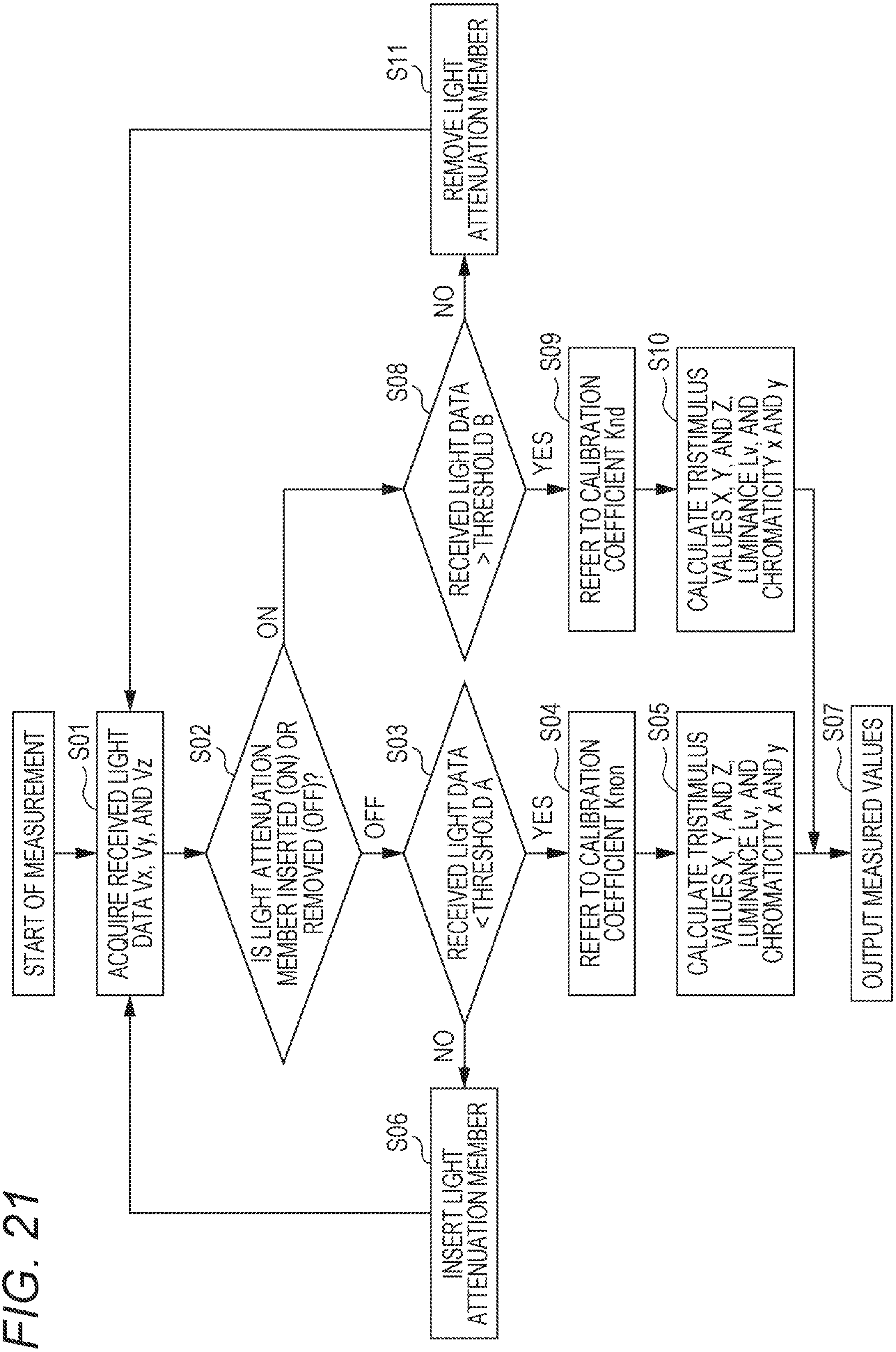
FIG. 21 is a flowchart for explaining a method of controlling insertion and removal of the light attenuation member in the photometric apparatus.

FIG. 21 is a flowchart for explaining a method of controlling the insertion and removal of the ND filter 40 performed in the photometric apparatus 10 according to the first embodiment. This control is performed by the controller 17.

After the start of measurement, the controller 17 acquires received light data $V_X$, $V_Y$, and $V_Z$ in step S01. Next, in step S02, the controller 17 determines whether the ND filter 40 is inserted in the light path (ON) or removed from the light path (OFF).

In a case where the ND filter 40 is removed from the light path (OFF in step S02), the controller 17 checks in step S03 whether or not the received light data is smaller than a threshold A. In a case where the light received data is smaller the threshold A (YES in step S03), the controller 17 refers to the calibration coefficient knon in step S04, then calculates the tristimulus values X, Y, and Z, the luminance LV, and the chromaticity x and y in step S05, and outputs the tristimulus values X, Y, and Z, the luminance LV, and the chromaticity x and y in step S07.

In a case where the light received data is not smaller the threshold A (NO in step S03), the controller 17 inserts the ND filter 40 into the light path in step S06, and returns to S01 to acquire received light data again.

In a case where the ND filter 40 is inserted in the light path (ON in step S02), the controller 17 checks whether the received light data is larger than a threshold B in step S08. In a case where the received light data is larger than the threshold B (YES in step S08), the controller 17 refers to the calibration coefficient knd in step S09, then calculates the tristimulus values X, Y, and Z, the luminance LV, and the chromaticity x and y in step S10, and outputs the tristimulus values X, Y, and Z, the luminance LV, and the chromaticity x and y in step S07.

In a case where the received light data is not larger than the threshold B (NO in step S08), the controller 17 removes the ND filter 40 from the light path in step S11, and then returns to step S01 to acquire received light data again.

Second Embodiment

In the first embodiment (including the various modification examples) described above, the linearity error (level difference caused by the ND filter), which occurs when the reflectance of the objects 1 to be measured is different, and is between the measured values in the state in which the ND filter 40 is not inserted in the light path of the light 2 to be measured and the measured values in the state in which the ND filter 40 is inserted in the light path is corrected by the reflective member. As a result, appropriate measured values were obtained regardless of the difference in the characteristics between the objects 1 to be measured.

In the second embodiment, a linearity error (level difference caused by the ND filter) is corrected by calculation using a calibration coefficient (corresponding to a correction coefficient).

Figure 22:
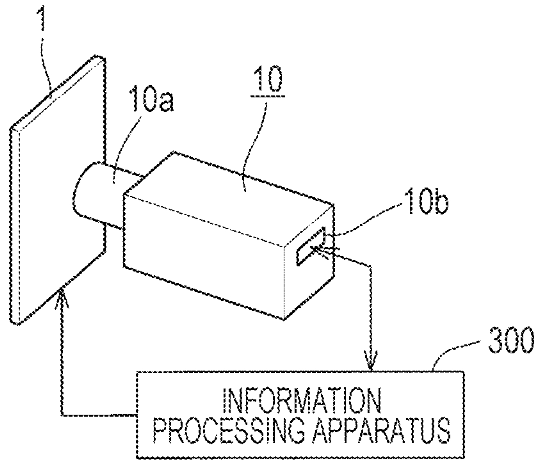
FIG. 22 illustrates an overall configuration diagram of a calibration system according to a second embodiment of the present invention.

FIG. 22 illustrates an overall configuration of a calibration system. The calibration system includes a photometric apparatus 10, an information processing apparatus 300 such as a personal computer, and an object 1 to be measured.

The photometric apparatus 10 includes a cylindrical lens barrel part 10*a* for taking in light 2 to be measured from an object 1 to be measured on the tip side of the photometric apparatus 10, and further includes a communicator 10*b* for communicating measurement data, a control signal, and the like with the information processing apparatus 300 on the back side of the photometric apparatus 10.

As the internal configuration of the photometric apparatus 10, the photometric apparatus 10 according to the first embodiment illustrated in FIG. 1 is used in the present embodiment, but any of the photometric apparatuses 10 according to the first to sixth modification examples illustrated in FIGS. 13, 15 to 18, and 20 may be used.

The internal configuration of the photometric apparatus 10 is the same as that described in the first embodiment, but the reflectance of the ND filter 40 is not limited, and a thin film filter, a glass absorption filter, or the like which is generally used as an ND filter is used. The ND filter 40 is inserted into and removed from the light path of the light 2 to be measured in accordance with the brightness of the object 1 to be measured as in the first embodiment. Specifically, the ND filter 40 is inserted into the light path when the amount of the light 2 to be measured is larger than a predetermined light amount.

Figure 23:
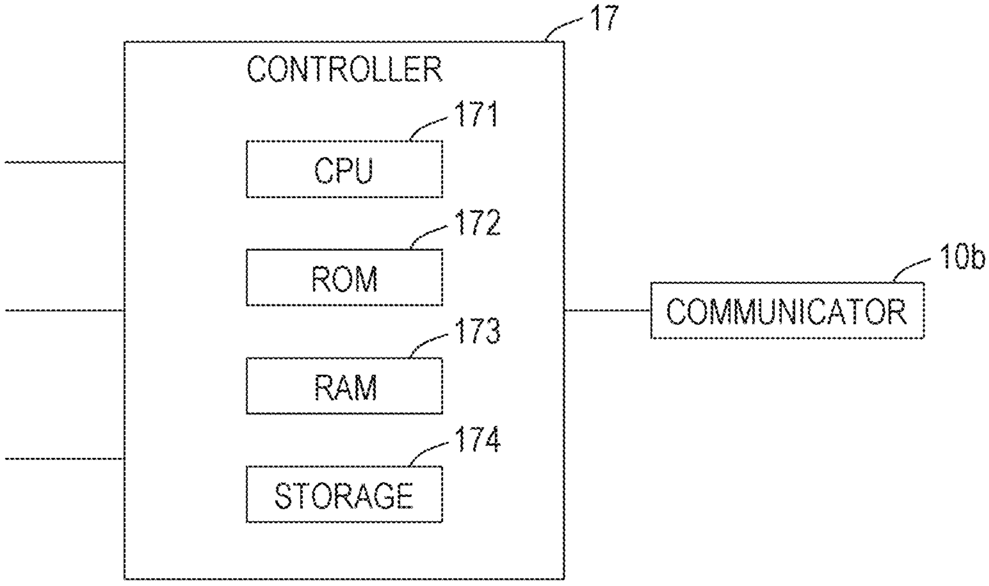
FIG. 23 is a block diagram illustrating details of a controller.

FIG. 23 illustrates a detailed configuration of the controller 17. The controller 17 includes a CPU 171, a ROM 172, a RAM 173, a storage 174, and the like.

The CPU 171 operates in accordance with an operation program to comprehensively control the entire photometric apparatus 10. For example, at the time of measurement of the object 1 to be measured, the controller 17 receives signals from the electrical processing sections 16*a* to 16*c*, performs a correction as necessary, and calculates measured values. Furthermore, in the present embodiment, the CPU 171 performs processing such as calculation of a calibration coefficient at the time of user calibration performed based on an instruction from a user of the photometric apparatus 10. Details of the processing will be described later.

The ROM 172 is a memory that stores the operation program and other data. The RAM 173 is a memory that provides a work area when the CPU 171 operates in accordance with the operation program. The RAM 173 also stores measured values of luminance, chromaticity, and the like which are calculation results.

The storage 174 includes a storage medium such as a flash ROM or a FeRAM, and stores various data such as a calibration coefficient when the photometric apparatus 10 is calibrated in a factory at the time of shipment, a calibration coefficient obtained by user calibration, and a predetermined setting value.

Next, calculation for obtaining measured values (tristimulus values) by the controller 17 will be described.

Figure 24A:
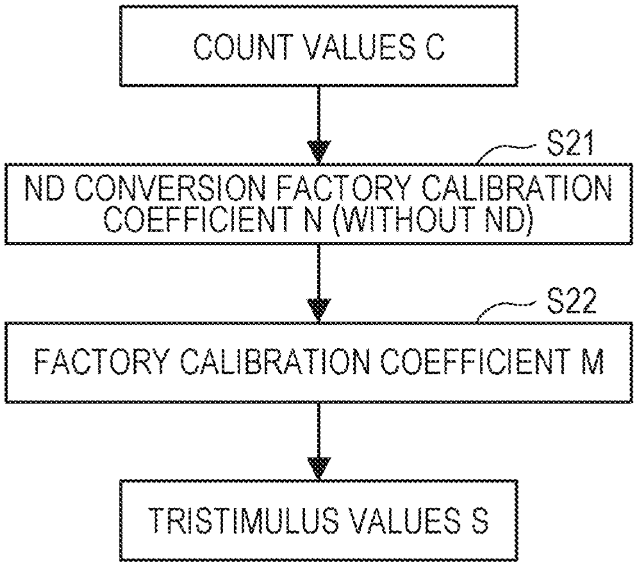
FIG. 24A and FIG. 24B are flowcharts illustrating arithmetic processing of calculating tristimulus values (X, Y, Z) by the controller.
Figure 24B:
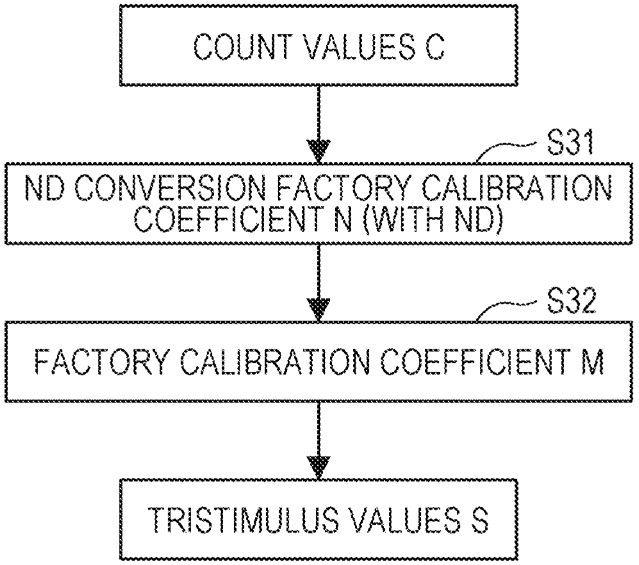

Generally, when the tristimulus values (X, Y, Z) are calculated from received light data (count values) obtained from the outputs of the light receiving sensors 13*b*, 14*b*, 15*b*, the controller 17 performs arithmetic operations as in flowcharts of FIGS. 24A and 24B. This is because individual variations occur due to variations in the internal reflectance of the photometric apparatus 10 and the like, and individual variations occur due to a change in the amount of light caused by insertion and removal of the ND filter 40 and a variation in the reflectance of the ND filter 40. It is necessary for the controller 17 to correct the values by performing calculations as in the flowcharts of FIGS. 24A and 24B.

FIG. 24A illustrates calculation processing in a case where the ND filter 40 is not inserted in the light path. The count values are multiplied by an ND conversion factory calibration coefficient N (without ND) in step S21, and are further multiplied by a factory calibration coefficient M in step S22 to obtain the tristimulus values.

FIG. 24B illustrates calculation processing in a case where the ND filter 40 is inserted in the light path. The count values are multiplied by an ND conversion factory calibration coefficient N (with ND) in step S31, and are further multiplied by the factory calibration coefficient M in step S32 to obtain the tristimulus values.

The "ND conversion factory calibration coefficient N (with ND)" in step S31 is a calibration coefficient for correcting a difference between measured values obtained in a case where the ND filter 40 is inserted in the light path and measured values obtained in a case where the ND filter is not inserted in the light path, and the difference is caused by the difference between the reflectance of the ND filter 40 and the internal reflectance of the photometric apparatus 10.

Specifically, the "ND conversion factory calibration coefficient N (with ND)" is a calibration coefficient for correction using a reference light source to match the measured data in the state in which the ND filter 40 is inserted in the light path with the measured data in the state in which the ND filter 40 is not inserted in the light path. When the amount of the light 2 to be measured is smaller than the predetermined light amount, the ND filter 40 is not inserted in the light path, and therefore, such a correction is unnecessary. Therefore, the "ND conversion factory calibration coefficient N (without ND)" in step S21 in FIG. 24A is a unit matrix.

The factory calibration coefficient M is used when calibration is performed using the reference light source in a factory before product shipment such that the output of the photometric apparatus 10 matches an output (reference value) obtained when the reference light source is measured by a reference device. The ND conversion factory calibration coefficient N (with ND), the ND conversion factory calibration coefficient N (without ND), and the factory calibration coefficient M are written in a storage or the like of the photometric apparatus 10.

When the tristimulus values are calculated using the factory calibration coefficient M, predetermined values are obtained in a case where the object 1 to be measured having the same surface reflectance as that of the light source used at the time of factory calibration is measured.

Next, a case where a customer's object 1 that is to be measured and has a different surface reflectance from that of the reference light source is measured will be considered.

Even in a case where the photometric apparatus 10 in which the matrix calibration is performed as described above is used, when the customer's object 1 that is to be measured and has a different surface reflectance is measured, tristimulus values are deviated from the predetermined values due to the difference between the reflectance of the calibration light source and the surface reflectance of the object 1 to be measured.

Therefore, many photometric apparatuses have a user calibration function. The user calibration function is a function of obtaining a user calibration coefficient U by using a master panel having representative characteristics of the object 1 to be measured. Specifically, an output value (reference value) when the master panel is measured by a reference device such as a spectral luminance meter is compared with an output value when the master panel is measured using the photometric apparatus 10 for measurement in a state in which the ND filter 40 is not inserted, and the user calibration coefficient U is obtained such that both of the output values coincide with each other.

Next, after the user calibration coefficient U is obtained, the tristimulus values are calculated using the user calibration coefficient U. To be specific, after the correction is performed with the factory calibration coefficient M illustrated in the flowcharts of FIG. 24A and FIG. 24B, the correction is performed by multiplying the count values by the user calibration coefficient U.

By this calibration processing, the predetermined values are obtained when the ND filter 40 is not inserted in the light path. However, when the reflectance of the surface of the ND filter 40 on the object 1 (to be measured) side is different from the internal reflectance (the reflectance of the color filters 13*a*, 14*a*, and 15*a* and the light receiving sensors 13*b*, 14*b*, and 15*b*) of the photometric apparatus 10, the measured values are affected by the difference between the reflectance in a case where only the user calibration is performed. Therefore, a linearity error (level difference caused by the ND filter) at the time of insertion and removal of the ND filter occurs between the glare type object 1 to be measured and the non-glare type object to be measured. This point is as described above in the section of <Problem Occurring When Dimming Member 40 is Inserted and Removed> in the first embodiment.

Therefore, in the second embodiment, in order to eliminate the above-described linearity error (level difference caused by the ND filter), correction processing by ND conversion user calibration described below is performed.

Similarly to the user calibration, the ND conversion user calibration coefficient is calculated by performing measurement using the master panel having the representative characteristics of the object 1 to be measured, which is different from that of the reference light source. The calculation processing is described below.

First, the master panel 1 is caused to emit light in a state in which the ND filter 40 is not inserted in the light path. Outputs (count values C) from the light receiving sensors 13*b*, 14*b*, and 15*b* at that time are stored. In this case, in a case where the luminance (brightness) of the master panel 1 is too high, the light receiving sensors are saturated, and it is not possible to perform appropriate ND conversion user calibration. Therefore, the count values C for which the ND conversion user calibration is performed are limited to a predetermined range.

Next, from the stored count values, the tristimulus values $S_{Un2(W,R,G,B)}$ in the state in which the ND filter 40 is not inserted in the light path are calculated using the ND conversion factory calibration coefficient N (without ND) and the factory calibration coefficient M. The tristimulus values are expressed according to the following Equation.

$$S_{Un2(W,R,G,B)} = M \cdot N(\text{without } ND) \cdot C$$

$$S_{Un2W} = \begin{pmatrix} X_{Un2W} \\ Y_{Un2W} \\ Z_{Un2W} \end{pmatrix} S_{Un2R} = \begin{pmatrix} X_{Un2R} \\ Y_{Un2R} \\ Z_{Un2R} \end{pmatrix} S_{Un2G} = \begin{pmatrix} X_{Un2G} \\ Y_{Un2G} \\ Z_{Un2G} \end{pmatrix} S_{Un2B} = \begin{pmatrix} X_{Un2B} \\ Y_{Un2B} \\ Z_{Un2B} \end{pmatrix}$$

Next, the master panel 1 is caused to emit light in a state in which the ND filter 40 is inserted in the light path. Outputs (count values C) from the light receiving sensors 13*b*, 14*b*, and 15*b* at that time are stored. In this case, when the luminance (brightness) of the master panel 1 is excessively low, the stability of the light emission of the master panel 1 is impaired, and appropriate ND conversion user calibration cannot be performed. Therefore, the count values C for which the ND conversion user calibration is performed are limited to a predetermined range.

Note that time for which exposure is performed with the ND filter 40 inserted in the light path is made longer than time for which exposure is performed without the ND filter 40 inserted in the light path. The reason for this is that, since it becomes dark when the ND filter 40 is inserted, the S/N is increased by making the exposure time longer than that in the state in which the ND filter 40 is not inserted. In this case, the exposure time in the state in which the ND filter 40 is inserted is preferably set to an exposure time in which the S/N is approximately the same as that in the state in which the ND filter 40 is not inserted.

From the stored count values, the tristimulus values $S_{Un1(W, R, G, B)}$ in the state in which the ND is inserted are calculated using the ND conversion factory calibration coefficient N (with ND) and the factory calibration coefficient M. The tristimulus values are expressed according to the following Equation.

$$S_{Un1(W,R,G,B)} = M \cdot N(\text{without } ND) \cdot C$$

$$S_{Un1W} = \begin{pmatrix} X_{Un1W} \\ Y_{Un1W} \\ Z_{Un1W} \end{pmatrix} S_{Un1R} = \begin{pmatrix} X_{Un1R} \\ Y_{Un1R} \\ Z_{Un1R} \end{pmatrix} S_{Un1G} = \begin{pmatrix} X_{Un1G} \\ Y_{Un1G} \\ Z_{Un1G} \end{pmatrix} S_{Un1B} = \begin{pmatrix} X_{Un1B} \\ Y_{Un1B} \\ Z_{Un1B} \end{pmatrix}$$

Then, the ND conversion user calibration coefficient Un is calculated from the tristimulus values $S_{Un1(W,R,G,B)}$ and the tristimulus values $S_{Un2(W, R, G, B)}$ and the calculated ND conversion user calibration coefficient Un is stored in the storage 174 as a first correction coefficient. The calculation of the ND conversion user calibration coefficient Un is performed by obtaining Un that satisfies $S_{Un2(W,R,G,B)}$ Un≈$S_{Un1(W, R, G, B)}$ by matrix calibration calculation.

Note that the calculation itself for obtaining the matrix calibration coefficients may be performed by a known method, but the outline of the calculation is described as follows.

Assuming that the RGB of the conversion source are a 3×3 matrix indicated by A1 and the RGB of the conversion destination are a 3×3 matrix indicated by A2, since $A2=Un_{RGB}\times A1$ and $Un_{RGB}=A2\times A1^{-1}$, an inverse matrix $A1^{-1}$ of A1 is obtained, and then $Un_{RGB}$ is obtained from $Un_{RGB}=A2\times A1^{-1}$.

Note that the measurement for performing the ND conversion user calibration is performed by causing the object 1 to be measured to emit light of white (W), red (R), green (G), and blue (B).

In this case, the order of exposure is as follows.

a) The emission color of the object 1 to be measured is fixed, and the presence (insertion) and absence (non-insertion) of the ND filter are switched. For example, the order is from white without ND, to white with ND, to red without ND, to red with ND, to green without ND, to green with ND, to blue without, to blue with ND.

b) The emission color is switched while fixing the presence or absence of the ND filter. For example, the order is from white without ND, to red without ND, to green without ND, to blue without ND, to white with ND, to red with ND, to green with ND, to blue with ND.

Either the order of a) or the order of b) may be used. However, considering the stability of the light emission of the object 1 to be measured, the order of a) in which the switching of the light emission is less frequent is desirable for increasing the calibration accuracy.

The light emission of the object 1 to be measured is controlled by the information processing apparatus 300. The object 1 to be measured emits light in a predetermined order based on a light emission instruction from the information processing apparatus 300. Further, the information processing apparatus 300 and the photometric apparatus 100 communicate with each other, and the photometric apparatus 100 switches the insertion and removal of the ND filter based on a signal from the information processing apparatus 300.

Further, in order to perform highly accurate calibration within the shortest possible time, it is desirable that the luminance (brightness) in the state with the ND filter is inserted in the light path be set to be high.

However, when the luminance (brightness) in the state with the ND filter is inserted in the light path is set to be high, the luminance (brightness) in the state in which the ND filter is not inserted in the light path becomes excessively high, the light receiving sensors 13*b*, 14*b*, 15*b* are saturated, and thus appropriate ND conversion user calibration cannot be performed.

In order to cope with this, when the photometric apparatus 10 detects the saturation of the light receiving sensors 13*b*, 14*b*, and 15*b*, the photometric apparatus 10 transmits a detection signal to the information processing apparatus 300, and the information processor 300 performs control to lower the luminance (brightness) of the object 1 to be measured such that the light receiving sensors 13*b*, 14*b*, 15*b* are not saturated.

The calculation of the ND conversion user calibration coefficient Un is performed by the photometric apparatus 10.

Figure 25:
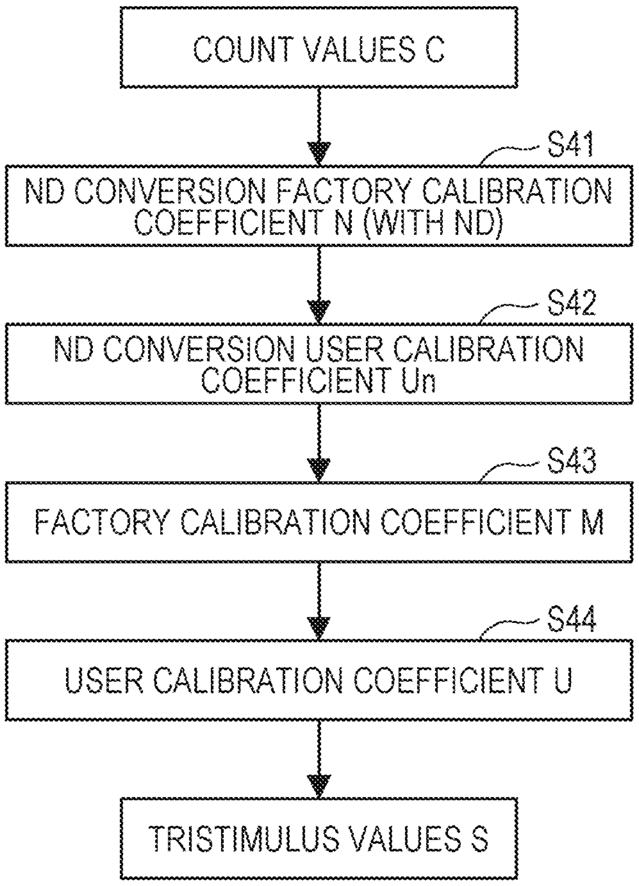
FIG. 25 is a flowchart illustrating arithmetic processing of calculating tristimulus values using an ND conversion user calibration coefficient Un.
Figure 28:
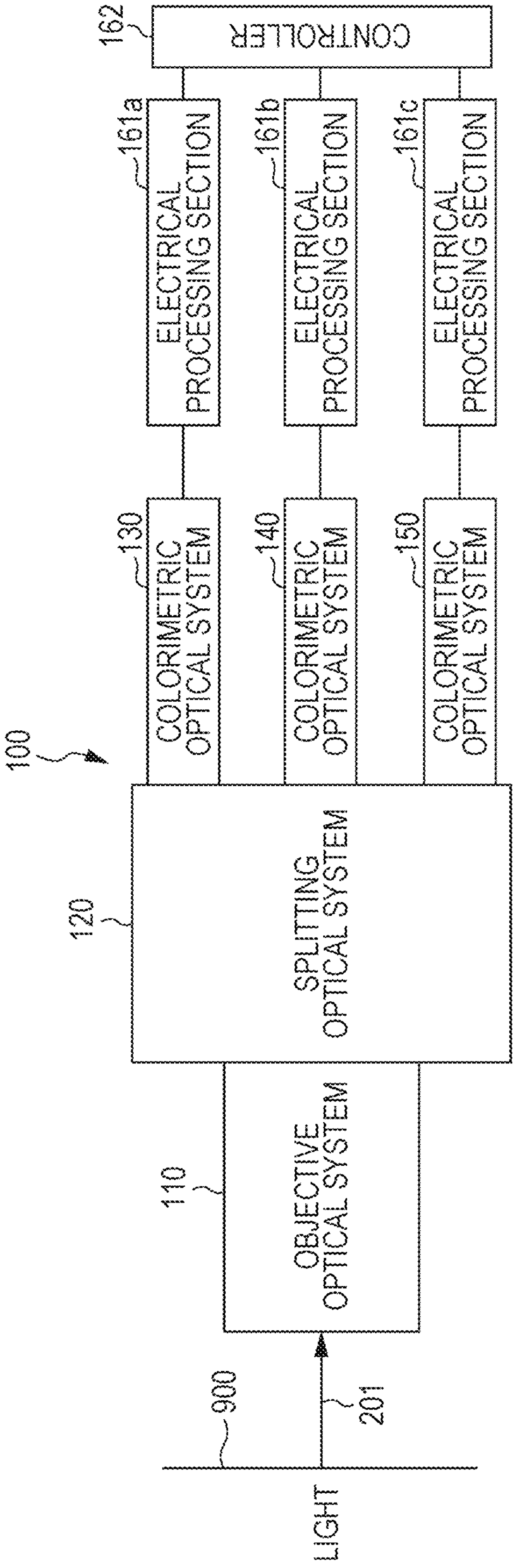
FIG. 28 is a block diagram illustrating a general configuration of a photometric apparatus.

The calculation processing in which the tristimulus values are calculated using the ND conversion user calibration coefficient Un obtained using the ND conversion user calibration function is illustrated in the flowchart of FIG. 25.

In the flowchart of FIG. 25, the count values Care multiplied by the ND conversion factory calibration coefficient N (with ND) in step S41, and are further multiplied by the ND conversion user calibration coefficient Un in step S42. The counted values C are further multiplied by the factory calibration coefficient M in step S43, and are further multiplied by the user calibration coefficient U in step S44 to obtain the tristimulus values.

As described above, the user calibration coefficient U is calculated based on an output value obtained when the master panel having the representative characteristics (reflectance in the present embodiment) of the object 1 to be measured is measured by the reference device and an output value obtained when the master panel is measured by the photometric apparatus 10 in a state in which the ND filter 40 is not inserted in the light path. The user calibration coefficient U is a second correction coefficient for matching both the output values, and is calculated by the photometric apparatus 10.

In this way, the count values from the light receiving sensors 13*b*, 14*b*, and 15*b* are corrected using the ND conversion user calibration coefficient Un. Therefore, even when the ND filter 40 in which the reflectance of the surface of the ND filter 40 is different from the internal reflectance (return rate) is used, a predetermined appropriate value is obtained in the measurement of customer's panels having different surface reflectances, such as the glare type object and the non-glare type object.

It is desirable that the operation of obtaining the ND conversion user calibration coefficient Un be performed continuously with the operation of obtaining the user calibration coefficient U, because the operation is less likely to be affected by variations over time. In addition, in the ND conversion user calibration, a range of luminance (brightness) for which appropriate calibration can be performed is limited. Therefore, when the ND conversion user calibration is performed after the user calibration, the ND conversion user calibration cannot be appropriately performed, and thus the previously performed user calibration may be useless. Therefore, when the operation of obtaining the ND conversion user calibration coefficient Un and the operation of obtaining the user calibration coefficient U are continuously performed, it is desirable that the ND conversion user calibration be performed first.

However, in some cases, since the predetermined values may be obtained by only the ND conversion user calibration Un or the predetermined values may be obtained by only the user calibration U, each operation may be separately performed.

In the present embodiment, the information processing apparatus 300 has a processing mode in which only the calculation of the ND conversion user calibration coefficient Un is performed, a processing mode in which only the calculation of the user calibration coefficient U is performed, and a processing mode in which both the coefficients are continuously calculated. Next, as illustrated in FIG. 26, the information processing apparatus 300 displays a mode selection screen, so that the user can select one of the modes with a check box or the like.

In addition, ND conversion user calibration coefficients UnA, UnB,—or user calibration coefficients UA, UB,—may be obtained in advance for each of objects 1 to be measured having different surface reflection characteristics. Further, as illustrated in FIG. 27, the obtained ND conversion user calibration coefficients UnA, UnB,—or further the user calibration coefficients UA, UB,—may be stored in the storage 174 in association with the types of the objects 1 to be measured. Then, the ND conversion user calibration coefficient Un and the like to be used may be selected according to the types of the objects 1 to be measured.

Although the second embodiment of the present invention has been described above, the present invention is not limited to above-described second embodiment.

For example, although the information processing apparatus 300 controls the light emission state of the object 1 to be measured, the photometric apparatus 10 may have a control function of controlling the light emission state of the object 1 to be measured, and the ND conversion user calibration or the user calibration may be performed by using the object 1 to be measured and the photometric apparatus 10. Furthermore, although the photometric apparatus 10 calculates the ND conversion user calibration coefficient Un and the user calibration coefficient U, the information processing apparatus 300 may calculate the ND conversion user calibration coefficient Un and the user calibration coefficient U and write the ND conversion user calibration coefficient Un and the user calibration coefficient U to the storage 174 of the photometric apparatus 10.

INDUSTRIAL APPLICABILITY

The present invention can be used as a photometric apparatus capable of measuring the luminance, chromaticity, and the like of light emitted from an object to be measured such as a display of a smartphone or a liquid crystal monitor.

Although one or more embodiments of the present invention have been described and illustrated in detail, the disclosed embodiments are made for purposes of illustration and example only and not limitation. The scope of the present invention should be interpreted by terms of the appended claims.

What is claimed is:

1. A photometric apparatus comprising:

a light receiver having one or a plurality of light receiving sensors that receive light to be measured from an object to be measured;

a controller that calculates a measured value based on an output from the one or plurality of light receiving sensors;

a light attenuation member that is disposed so as to be insertable in and removable from a light path of the light to be measured and attenuates the light to be incident on the light receiver;

a corrector that corrects a difference between a measured value calculated by the controller in a state in which the light attenuation member is inserted in the light path and a measured value calculated by the controller in a state in which the light attenuation member is not inserted in the light path, the measured values varying depending on a characteristic of the object to be measured; and one or a plurality of wavelength-selective filters in front of the one or plurality of light receiving sensors, wherein the corrector suppresses a level difference in linearity which is a relation between a brightness of the object to be measured and the measured values and varies depending on the characteristic of the object to be measured.

2. The photometric apparatus according to claim 1, wherein the corrector is a reflective member that is inserted into the light path when the light attenuation member is inserted into the light path, and is removed from the light path when the light attenuation member is removed from the light path, and the reflective member reflects light toward the object to be measured side.

3. The photometric apparatus according to claim 2, wherein the reflective member is formed integrally with the light attenuation member.

4. The photometric apparatus according to claim 2, wherein the reflective member includes one or a plurality of members and is different from the light attenuation member.

5. The photometric apparatus according to claim 2, wherein a reflectance of the reflective member is an optimum reflectance of ±4%.

6. The photometric apparatus according to claim 1, wherein the corrector includes a controller that calculates a measured value using a correction coefficient corresponding to a physical property of the object to be measured.

7. The photometric apparatus according to claim 6, further comprising a storage that stores the correction coefficient.

8. The photometric apparatus according to claim 6, wherein the controller obtains, based on an instruction from a user, an output value output from the light receiver in the state in which the light attenuation member is inserted in the light path and an output value output from the light receiver in the state in which the light attenuation member is not inserted in the light path, and obtains the correction coefficient based on the output values.

9. The photometric apparatus according to claim 8, wherein an exposure time for obtaining the output value output from the light receiver in the state in which the light attenuation member is inserted is longer than an exposure time for obtaining the output value output from the light receiver in the state in which the light attenuation member is not inserted.

10. The photometric apparatus according to claim 8, wherein the controller obtains the correction coefficient in a case where the output value output from the light receiver in the state in which the light attenuation member is inserted in the light path and the output value output from the light receiver in the state in which the light attenuation member is not inserted in the light path are within a predetermined range.

11. The photometric apparatus according to claim 7, wherein the storage stores a plurality of correction coefficients corresponding to a plurality of objects to be measured.

12. The photometric apparatus according to claim 6, wherein the physical property of the object to be measured is a reflectance of the object to be measured.

13. A calibration system for calibrating the photometric apparatus according to claim 8, the calibration system comprising an information processing apparatus, wherein in a case where the correction coefficient is defined as a first correction coefficient, the information processing apparatus requests the controller to obtain the first correction coefficient based on an instruction from a user, and further requests the controller to obtain a second correction coefficient based on a reference value of the object to be measured and an output value output from the light receiver when the light receiver receives light from the object to be measured in the state in which the light attenuation member is not inserted in the light path.

14. The calibration system according to claim 13, wherein the information processing apparatus requests the controller to obtain the second correction coefficient after requesting the controller to obtain the first correction coefficient.

15. A calibration system for calibrating the photometric apparatus according to claim 8, the calibration system comprising an information processing apparatus, wherein in a case where the correction coefficient is defined as a first correction coefficient, the information processing apparatus has a mode in which, apart from processing of requesting, based on an instruction from a user, the controller to obtain the first correction coefficient, the information processing apparatus requests the controller to perform only processing of obtaining a second correction coefficient based on a reference value of the object to be measured and an output value output from the light receiver when the light receiver receives light from the object to be measured in the state in which the light attenuation member is not inserted in the light path.

16. A calibration system for calibrating the photometric apparatus according to claim 8, the calibration system comprising an information processing apparatus, wherein in a case where the correction coefficient is defined as a first correction coefficient, the information processing apparatus has a mode in which the information processing apparatus requests the controller to perform only processing of obtaining the first correction coefficient, apart from processing of requesting, based on an instruction from a user, the controller to obtain a second correction coefficient based on a reference value of the object to be measured and an output value output from the light receiver when the light receiver receives light from the object to be measured in the state in which the light attenuation member is not inserted in the light path.

17. The photometric apparatus according to claim 1, wherein the light attenuation member is inserted in and removed from the light path in accordance with the brightness of the object to be measured.

18. The photometric apparatus according to claim 1, wherein each of the one or plurality of light receiving sensors is a silicon sensor.

19. The photometric apparatus according to claim 1, wherein the one or plurality of wavelength-selective filters is a thin film filter.

20. The photometric apparatus according to claim 1, wherein the light attenuation member includes a thin film filter.

21. The photometric apparatus according to claim 1, further comprising a splitting optical system that splits the light to be measured into a plurality of light rays.

22. A photometric method for a photometric apparatus including a light receiver having one or a plurality of light receiving sensors that receive light to be measured from an object to be measured, a controller that calculates a measured value based on an output from the one or plurality of light receiving sensors, and one or a plurality of wavelength-selective filters in front of the one or plurality of light receiving sensors, the photometric method comprising:

inserting and removing a light attenuation member into and from a light path of the light to be measured in the photometric apparatus, and correcting a difference between a measured value calculated by the controller in a state in which the light attenuation member is inserted in the light path and a measured value calculated by the controller in a state in which the light attenuation member is not inserted in the light path, the measured values varying depending on a characteristic of the object to be measured, wherein the correcting suppresses a level difference in linearity which is a relation between a brightness of the object to be measured and the measured values and varies depending on the characteristic of the object to be measured.

23. The photometric apparatus according to claim 1, wherein in a case where the light receiver has the one light receiving sensor, the one wavelength-selective filter is provided in front of the one light receiving sensor, and in a case where the light receiver has the plurality of light receiving sensors, each of the plurality of wavelength-selective filters is provided in front of each of the plurality of light receiving sensors, wherein the each of the plurality of wavelength-selective filters has a different wavelength band from each other.

* * * * *